(12) United States Patent
Oshiro et al.

(10) Patent No.: US 7,885,447 B2
(45) Date of Patent: Feb. 8, 2011

(54) IMAGE ACQUIRING APPARATUS INCLUDING MACRO IMAGE ACQUIRING AND PROCESSING PORTIONS, IMAGE ACQUIRING METHOD, AND IMAGE ACQUIRING PROGRAM

(75) Inventors: Masafumi Oshiro, Hamamatsu (JP); Yoshinori Hashimoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1010 days.

(21) Appl. No.: 11/477,805

(22) Filed: Jun. 30, 2006

(65) Prior Publication Data
US 2007/0269085 A1  Nov. 22, 2007

(30) Foreign Application Priority Data
May 19, 2006  (JP)  ............................ P2006-140567

(51) Int. Cl.
*G06K 9/00* (2006.01)
(52) U.S. Cl. ...................... 382/133; 382/128; 359/362; 359/368; 359/642
(58) Field of Classification Search ................ 382/100, 382/128, 133, 134, 141, 149, 151, 168, 172, 382/181, 190, 192, 194, 203, 217, 220, 224, 382/225, 254, 256, 257, 258, 263, 266, 271, 382/275, 286, 291; 356/388, 394, 397, 398, 356/456, 625, 627, 628
See application file for complete search history.

(56) References Cited

U.S. PATENT DOCUMENTS

| | | | |
|---|---|---|---|
| 4,508,453 A * | 4/1985 | Hara et al. | ................... 356/394 |
| 5,991,028 A * | 11/1999 | Cabib et al. | ................. 356/456 |
| 6,272,235 B1 | 8/2001 | Bacus et al. | |
| 6,396,941 B1 | 5/2002 | Bacus et al. | |
| 6,522,774 B1 | 2/2003 | Bacus et al. | |
| 6,615,141 B1 * | 9/2003 | Sabry et al. | .................... 702/19 |
| 6,631,331 B1 * | 10/2003 | Sabry et al. | .................... 702/19 |
| 6,671,624 B1 * | 12/2003 | Dunlay et al. | ................. 702/19 |
| 6,674,881 B2 | 1/2004 | Bacus et al. | |
| 6,674,884 B2 | 1/2004 | Bacus et al. | |

(Continued)

FOREIGN PATENT DOCUMENTS

JP   2005-234262   5/2003

(Continued)

*Primary Examiner*—Sath V Perungavoor
*Assistant Examiner*—Jason Heidemann
(74) *Attorney, Agent, or Firm*—Drinker Biddle & Reath LLP

(57) ABSTRACT

An image acquiring apparatus for acquiring images of a sample includes a macro image acquiring unit 20 for acquiring a macro image of the sample, a dark field light source 26 to be used for acquiring a dark field macro image of the sample as a macro image, a macro image processing unit 66 which generates a reference macro image by processing image data of the macro image, and an image pickup condition setting unit 65 which sets an image acquiring range corresponding to a range including an object of image acquisition as an image pickup condition of a micro image of the sample by referring to the reference macro image. This realizes an image acquiring apparatus, an image acquiring method, and an image acquiring program by which a macro image of a sample as an object of image acquisition is preferably acquired.

23 Claims, 23 Drawing Sheets

U.S. PATENT DOCUMENTS

| | | |
|---|---|---|
| 6,711,283 B1 | 3/2004 | Soenksen |
| 6,716,588 B2 * | 4/2004 | Sammak et al. ............... 435/7.2 |
| 6,800,249 B2 * | 10/2004 | de la Torre-Bueno ......... 422/63 |
| 6,816,606 B2 | 11/2004 | Feineigle et al. |
| 6,847,729 B1 | 1/2005 | Clinch et al. |
| 6,917,696 B2 | 7/2005 | Soenksen |
| 2002/0090120 A1 * | 7/2002 | Wetzel et al. ............... 382/128 |
| 2002/0090127 A1 * | 7/2002 | Wetzel et al. ............... 382/133 |
| 2003/0215127 A1 * | 11/2003 | Stern et al. .................. 382/141 |
| 2003/0231791 A1 * | 12/2003 | Torre-Bueno et al. ....... 382/133 |
| 2004/0009098 A1 * | 1/2004 | Torre-Bueno ................ 422/63 |
| 2004/0184678 A1 | 9/2004 | Maddison |

FOREIGN PATENT DOCUMENTS

| | | |
|---|---|---|
| JP | 3427068 | 5/2003 |
| JP | 2005-37902 | 2/2005 |

* cited by examiner (a)

(b)

(a)

(b)

(a)

(b)

(a)

(b)

(a)

(b)

(a)

(b)

(c)

(a)

(b)

(c)

IMAGE ACQUIRING APPARATUS INCLUDING MACRO IMAGE ACQUIRING AND PROCESSING PORTIONS, IMAGE ACQUIRING METHOD, AND IMAGE ACQUIRING PROGRAM

BACKGROUND OF THE INVENTION

1. Field of the Invention

The present invention relates to an image acquiring apparatus, an image acquiring method, and an image acquiring program for acquiring images of a sample.

2. Related Background Art

Recently, in the field of pathology, etc., there are known virtual microscopes which can be operated as if an operator operates a sample through a real microscope in a virtual space of a personal computer or the like. Sample data to be handled in such a virtual microscope is based on image data of a sample acquired in advance by using a real microscope at high resolution.

For realizing image operation in the virtual microscope, it is demanded that an image acquiring apparatus which acquires image data of a sample to be thus used in a virtual microscope acquires an image of a sample at sufficiently high resolution. To efficiently acquire the image with high resolution, a structure in which an image of a sample is acquired by using a camera for macroscopic image acquisition and a camera for microscopic image acquisition is described in Document 1: U.S. Pat. No. 6,816,606 (for example, refer to Document 1: U.S. Pat. No. 6,816,606, Document 2: Japanese Patent Application Laid-Open No. 2005-37902, Document 3: Japanese Patent Application Laid-Open No. 2005-234262, and Document 4: Japanese Patent Publication No. 3427068).

SUMMARY OF THE INVENTION

In the structure including a macro camera and a micro camera as described above, for example, a method is considered in which a macro image is acquired first by the macro camera, an image pickup condition for the sample is set with reference to the macro image, and then, a micro image is acquired by the micro camera with reference to the set image pickup condition. Conventionally, in acquisition of image data of a sample to be used in a virtual microscope, a slide in which a sample such as a biological sample stained with an absorptive dye is sealed is mainly set as an object. In this case, a macro image of the sample can be acquired at a sufficient contrast by means of normal transmitted illumination.

On the other hand, as a sample targeted by the virtual microscope, not only a conventional sample stained with an absorptive dye but also, for example, a sample stained with a fluorescent dye are likely objects. However, if transmitted illumination is used for acquiring a macro image of such a sample, the contrast in an obtained macro image lowers, and it may become difficult to recognize the sample in the image. This poses a problem when the macro image is used for setting image pickup conditions to acquire a micro image with high resolution, as described above.

The present invention has been made in order to solve the problem described above, and an object thereof is to provide an image acquiring apparatus, an image acquiring method, and an image acquiring program by which a macro image of a sample is preferably acquired.

In order to achieve the object, an image acquiring apparatus of the invention includes: (1) macro image acquiring means for acquiring a macro image of a sample, (2) dark field illuminating means to be used to acquire a dark field macro image of the sample as a macro image, (3) macro image processing means for processing image data of a macro image to generate a reference macro image, and (4) image pickup condition setting means for setting an image acquiring range corresponding a range including an object of image acquisition as an image pickup condition for a micro image of the sample with reference to the reference macro image.

An image acquiring method according to the present invention includes: (a) a dark field macro image acquiring step for acquiring a dark field macro image as a macro image of a sample by using dark field illuminating means, (b) a macro image processing step for processing image data of the macro image to generate a reference macro image, and (c) an image pickup condition setting step for setting an image acquiring range corresponding to a range including an object of image acquisition as an image pickup condition of a micro image of the sample by referring to the reference macro image.

An image acquiring program according to the present invention makes a computer execute: (a) dark field macro image acquisition control processing for controlling an operation for acquiring a dark field macro image as a macro image of a sample by using dark field illuminating means, (b) macro image processing for processing image data of the macro image to generate a reference macro image, and (c) image pickup condition setting processing for setting an image acquiring range corresponding to a range including an object of image acquisition as an image pickup condition of a micro image of the sample by referring to the reference macro image.

In the above-described image acquiring apparatus, image acquiring method, and image acquiring program, macro image acquiring means is provided for a sample as an object of image acquisition to acquire a macro image showing a whole image of the sample, and by using a reference macro image obtained by applying predetermined processing to this macro image, an image acquiring range as an image pickup condition to acquire a micro image is set. Thereby, for example, when acquiring a micro image of a sample with high resolution to be handled as image data of the sample in a virtual microscope, a micro image can be acquired in a preferable range including the object (for example, a biological sample in a slide) by referring to the set image acquiring range.

Furthermore, in the acquisition of the macro image of the sample, a dark field macro image is acquired by illuminating the sample by using dark field illuminating means for oblique illumination or the like. With this structure, for example, even when a sample stained with a fluorescent dye is an object of image acquisition, a macro image of the sample can be preferably acquired at a sufficient contrast. Such a macro image with high contrast is effectively used for setting image pickup conditions such as an image acquiring range, etc., when acquiring a micro image, and image pickup conditions of a micro image can be reliably set.

According to the image acquiring apparatus, image acquiring method, and image acquiring program of the invention, an image acquiring range as an image pickup condition to acquire a micro image is set by using a reference macro image obtained by applying predetermined processing to a macro image acquired from a sample, and a dark field macro image is acquired by illuminating the sample by using dark field illuminating means for oblique illumination or the like in acquisition of a macro image of the sample, whereby, for example, even when a sample stained with a fluorescent dye is an object of image acquisition, a macro image of the sample can be preferably acquired.

DESCRIPTION OF THE PREFERRED EMBODIMENTS

Figure 1:
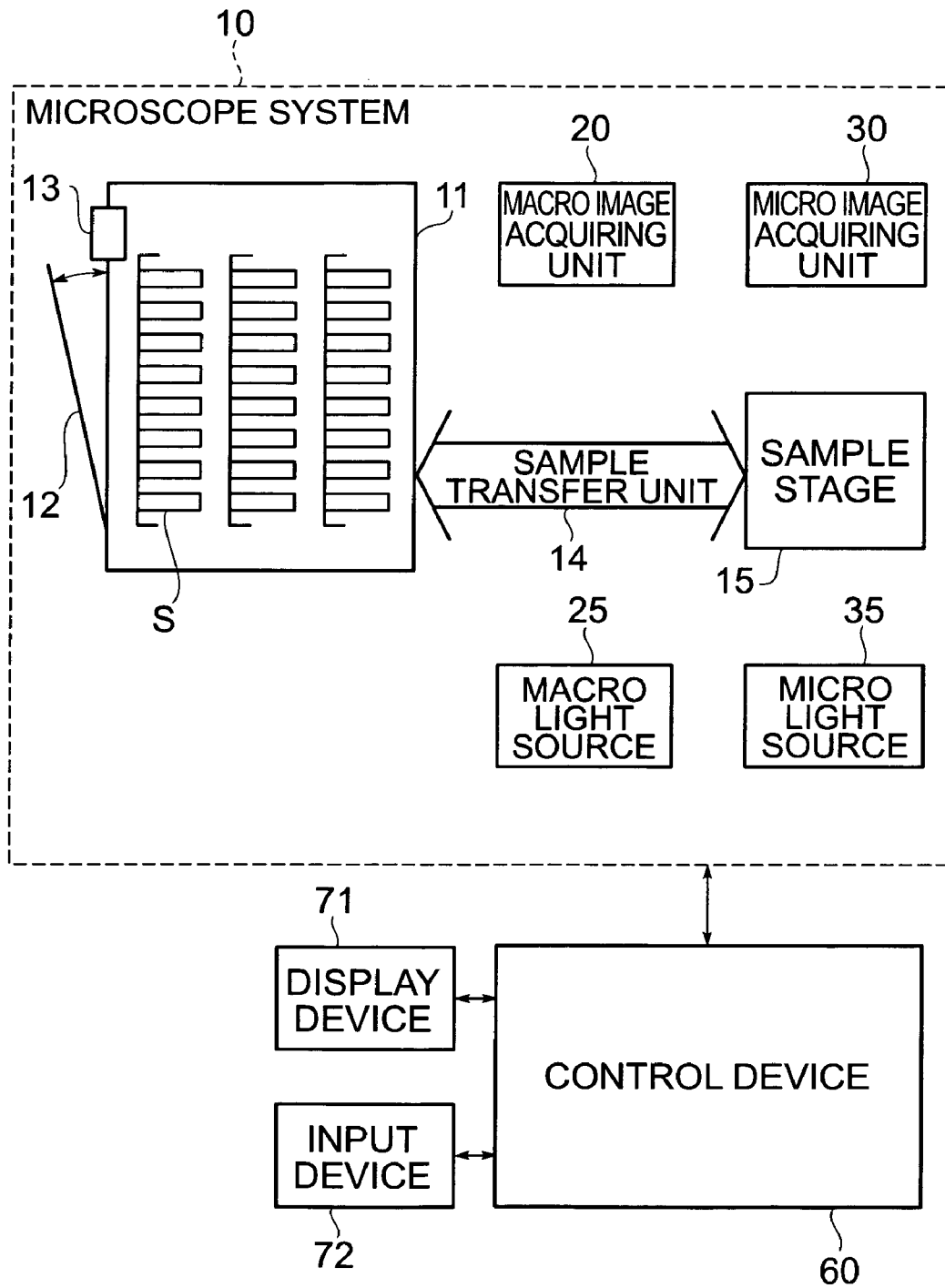
FIG. 1 is a block diagram showing a structure of an embodiment of an image acquiring apparatus.

Hereinafter, preferred embodiments of an image acquiring apparatus, an image acquiring method, and an image acquiring program of the invention will be described along with the drawings. In the description of the drawings, the same components are attached with the same reference numerals, and overlapping description will be omitted. The dimensional ratios of the drawings are not always the same as those in the description.

First, an entire structure of an image acquiring apparatus will be described. FIG. 1 is a block diagram showing a structure of an embodiment of an image acquiring apparatus according to the invention. The image acquiring apparatus of this embodiment is a microscope system to be used for acquiring an image of a sample S at high resolution, and includes a microscope system 10 for acquiring an image of the sample S and a control device 60 for controlling the image acquisition in the microscope system 10. A slide (preparation) in which a biological sample, such as a tissue slice stained with an absorptive dye or fluorescent dye, is enclosed in a slide glass when image data to be used in a virtual microscope is acquired can be mentioned as an example of the sample S serving as an object of image acquisition.

The microscope system 10 includes a sample storage unit 11, a macro image acquiring unit 20, and a micro image acquiring unit 30. The sample storage unit 11 is a storing means structured so as to store a plurality of samples (for example, a plurality of slides containing biological samples sealed, respectively) as objects of image acquisition. In this sample storage unit 11, a door 12 to be used by an operator to store and extract a sample S is provided. In this embodiment, an interlock mechanism 13 for preventing the door 12 from being opened by mistake during image acquisition is attached.

The macro image acquiring unit 20 is first image acquiring means for acquiring a macro image as a low-magnification image of a sample S. This image acquiring unit 20 acquires a macro image at low resolution corresponding to a whole image of a sample S. For the macro image acquiring unit 20, a macro light source 25 which radiates light for generating an optical image of a sample S to acquire a macro image is provided.

On the other hand, the micro image acquiring unit 30 is second image acquiring means for acquiring a micro image as a high-magnification image of a sample S. In this image acquiring unit 30, a micro image with high resolution of a target sample S is acquired. For the micro image acquiring unit 30, a micro light source 35 which radiates light for generating an optical image of a sample S to acquire a micro image is provided.

In the microscope system 10, as sample moving means for moving a sample S among positions in the microscope system 10, a sample transfer unit 14 and a sample stage 15 are provided. The sample transfer unit 14 is transferring means for transferring a sample S as appropriate between a position for storing the sample S in the sample storage unit 11 and each of the image acquiring positions for the macro image acquiring unit 20 and the micro image acquiring unit 30. The sample stage 15 carries a sample S placed thereon when acquiring a macro image or a micro image, and is used for setting and adjusting an image acquiring position of the sample S.

The control device 60 is control means for controlling an image acquiring operation in the microscope system 10, setting image acquiring conditions, and processing acquired image data of a sample S. The control device 60 consists of a computer including, for example, a CPU and storage devices such as a necessary memory and a hard disk. To this control device 60, a display device 71 and an input device 72 are connected. The display device 71 is, for example, a CRT display or a liquid crystal display, and is used for displaying operation screens necessary for operations of this image acquiring apparatus or an acquired image of a sample S. The input device 72 is, for example, a keyboard or a mouse, and is used for inputting necessary information for image acquisition and inputting instructions for an image acquiring operation.

Figure 2:
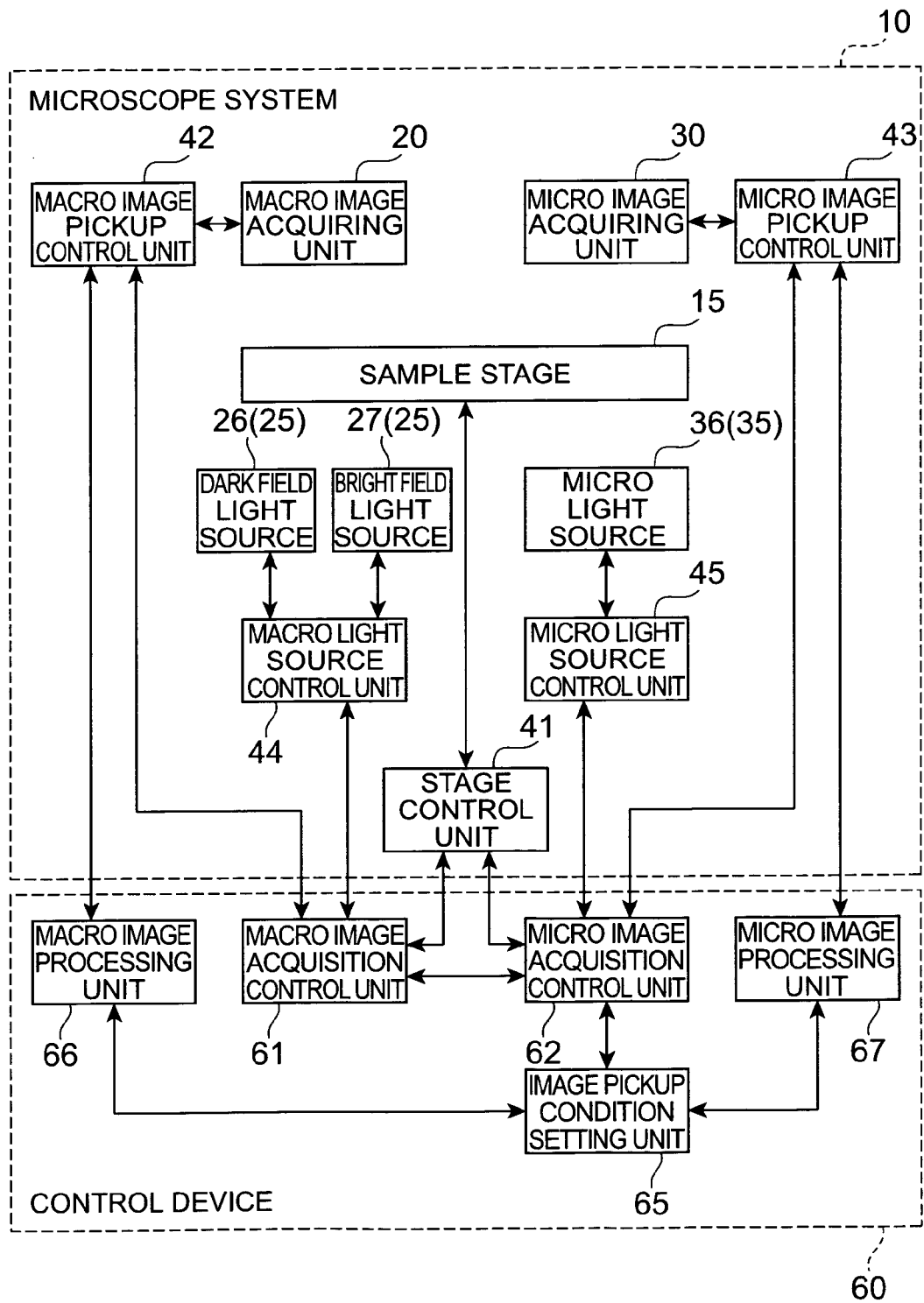
FIG. 2 is a block diagram showing an example of a structure of a microscope system and a control device.
Figure 3:
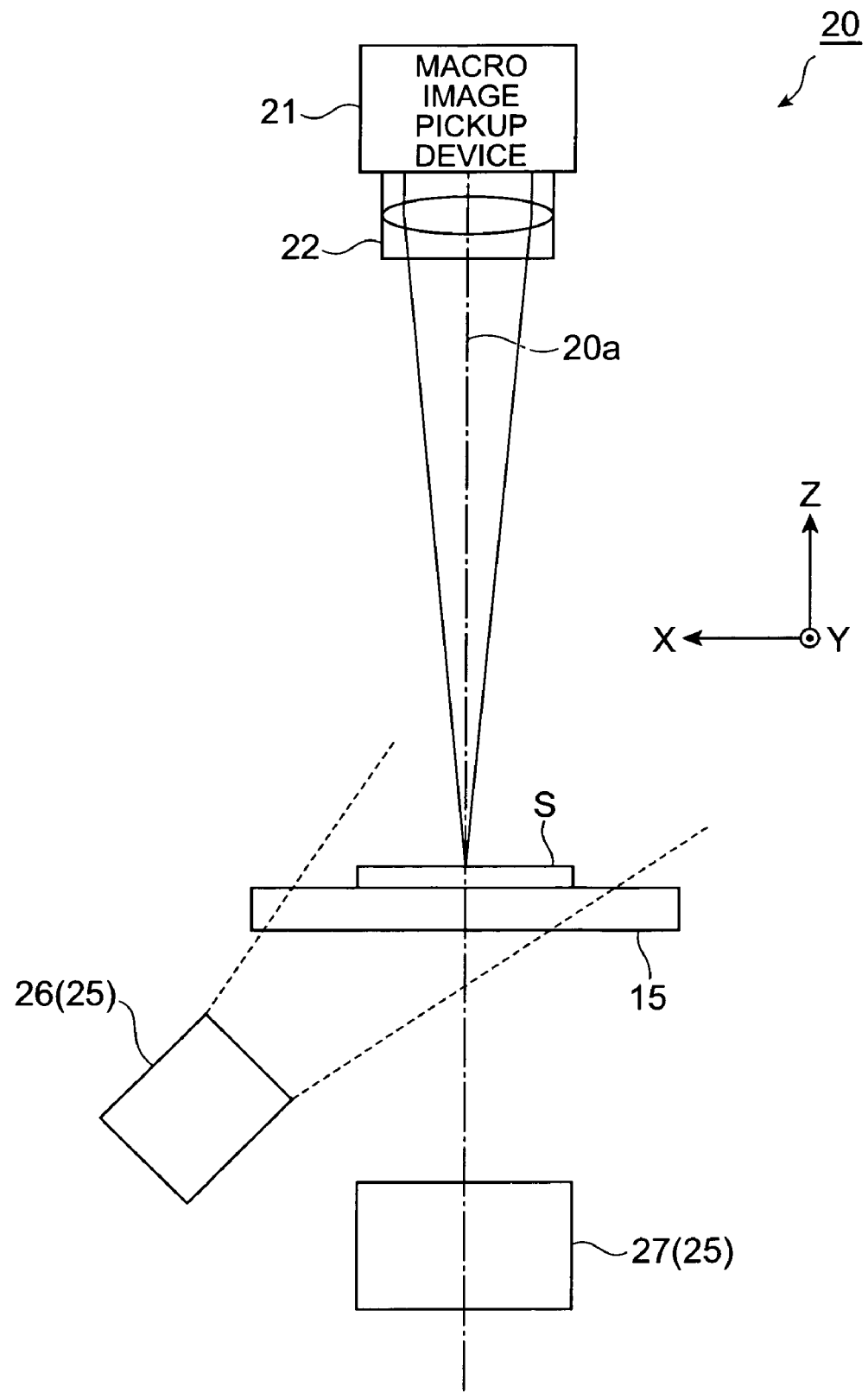
FIG. 3 is a drawing schematically showing an example of a structure of a macro image acquiring optical system.
Figure 4:
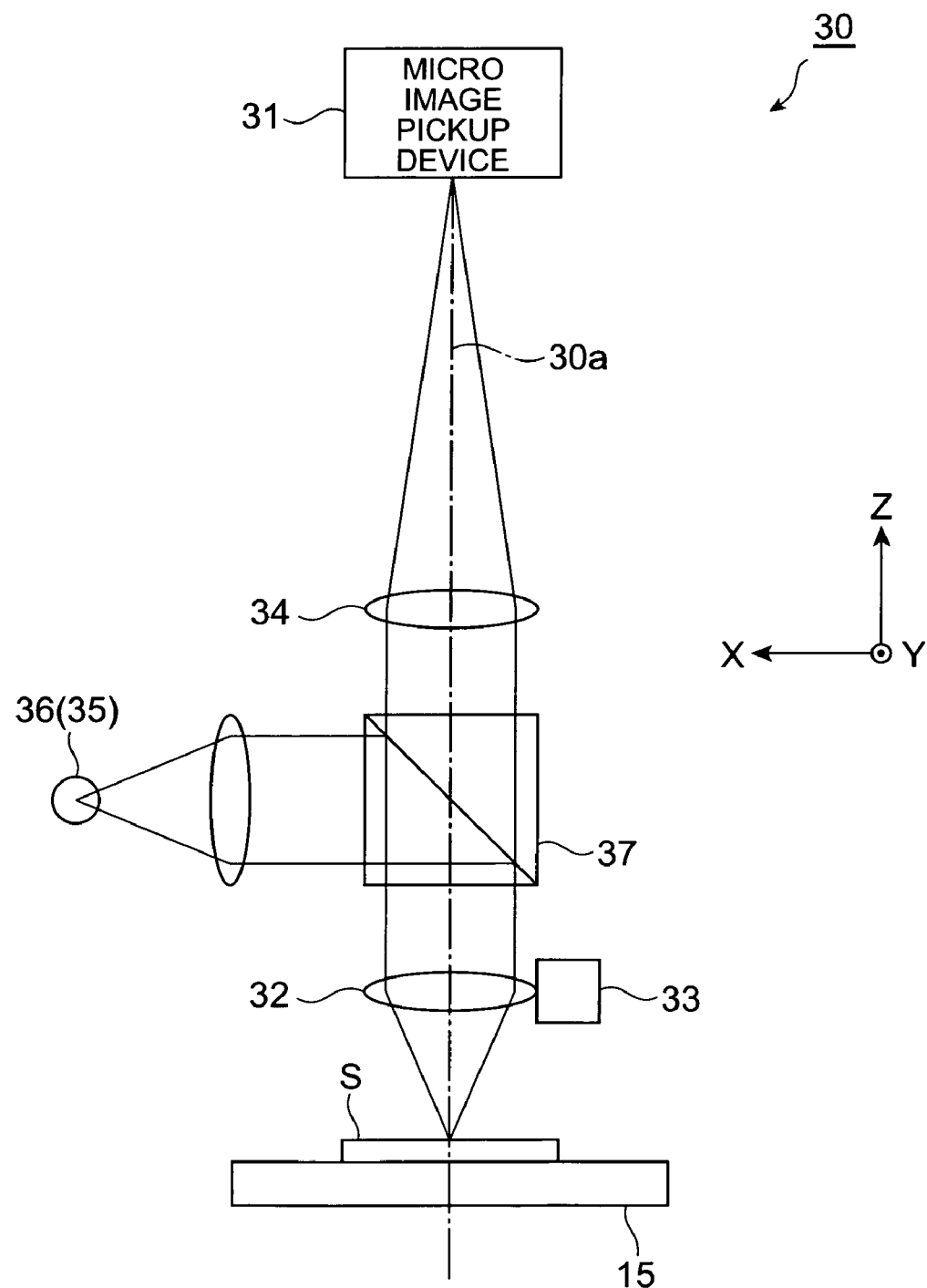
FIG. 4 is a drawing schematically showing an example of a structure of a micro image acquiring optical system.

The structure of the image acquiring apparatus shown in FIG. 1 will be further described. FIG. 2 is a block diagram showing an example of a structure of the microscope system 10 and the control device 60 in the image acquiring apparatus. FIG. 3 is a drawing schematically showing an example of a structure of a macro image acquiring optical system in the microscope system 10. FIG. 4 is a drawing schematically showing an example of a structure of a micro image acquiring optical system in the microscope system 10.

Herein, as shown in FIG. 3 and FIG. 4, concerning the structure of the microscope system 10, two directions orthogonal to each other in the horizontal direction are defined as an X-axis direction and a Y-axis direction, and a vertical direction orthogonal to the horizontal direction is defined as a Z-axis direction. Among these, the Z-axis direction as the vertical direction is a direction of an optical axis of image acquisition in this microscope system. In FIG. 2, illustration of the sample storage unit 11 and the sample transfer unit 14 is omitted. Herein, the structure of the microscope system 10 in a case where a sample stained with a fluorescent dye is set as an object of image acquisition will be described by way of example.

The sample S is placed on the sample stage 15 at the time of image acquisition in the image acquiring unit 20 or 30. This sample stage 15 is structured as an XY stage movable in the X-axis direction and the Y-axis direction by using a stepping motor, a DC motor, or a servo motor. With this structure, by driving the sample stage 15 within the XY plane, the image acquiring position in the image acquiring unit 20 or 30 with respect to the sample S is set and adjusted. In this embodiment, this sample stage 15 is movable between an image acquiring position in the macro image acquiring unit 20 and an image acquiring position in the micro image acquiring unit 30.

With respect to the macro image acquiring position for acquiring a macro image of the sample S, as shown in FIG. 3, a macro image acquiring unit 20 and a macro light source 25 are set at predetermined positions with respect to the optical axis 20a. The macro light source 25 is illuminating means for irradiating the sample S with light for generating an optical image for macro image acquisition.

The macro image acquiring unit 20 is structured by using a macro image pickup device 21 such as a two-dimensional CCD sensor capable of acquiring a two-dimensional image of an optical image of the sample S. Between the macro image acquiring position where the sample S is disposed and the image pickup device 21, an image pickup optical system 22 is provided as an optical system for guiding the optical image of the sample S.

In this embodiment, as shown in FIG. 2 and FIG. 3, as the macro light source 25, two light sources of a dark field light source 26 and a bright field light source 27 are provided. Of these, the macro dark field light source 26 is dark field illuminating means to be used for acquiring a dark field macro image as a macro image of the sample S, and is disposed at a position for obliquely irradiating a surface orthogonal to the optical axis for acquiring a macro image with light from the opposite side of the macro image acquiring unit 20. At this time, the dark field light source 26 is structured to obliquely irradiate an optical path (light path for guiding the optical image between the sample S and the macro image pickup device 21) for acquiring a macro image with light from the opposite side of the macro image acquiring unit 20. In detail, in the structure shown in FIG. 3, the dark field light source 26 is installed as oblique illuminating means at a position for radiating light from the oblique lower side of the sample S with respect to the optical axis 20a. The macro bright field light source 27 is bright field illuminating means to be used when acquiring a bright field macro image as a macro image of the sample S, and is installed as transmission illuminating means below the sample stage 15.

On the other hand, with respect to the micro image acquiring position for acquiring a micro image of a sample S, as shown in FIG. 4, a micro image acquiring unit 30 is installed at a predetermined position on the optical axis 30a. The micro image acquiring unit 30 is structured by using a micro image pickup device 31 such as a one-dimensional CCD sensor capable of acquiring a one-dimensional image of an optical image of the sample S. Between the micro image acquiring position at which the sample S is disposed and the image pickup device 31, as an optical system for guiding the optical image of the sample S, an objective lens 32 and a light guide optical system 34 are provided. The objective lens 32 generates an optical image of the sample S by making the light incident thereon from the sample S. The light guide optical system 34 is made of, for example, a tube lens, and guides the optical image of the sample S to the image pickup device 31.

In this embodiment, for the sample S disposed at the micro image acquiring position, an excitation light source 36 is provided as a micro light source 35 of illuminating means for radiating light for generating an optical image for micro image acquisition. In the structure shown in FIG. 4, between the objective lens 32 and the light guide optical system 34, a dichroic mirror 37 is disposed. The dichroic mirror 37 reflects exciting light made incident via an optical system such as a lens from the excitation light source 36 and irradiates the sample S with it, and transmits fluorescence generated in the sample S to the light guide optical system 34.

Thereby, the micro image acquiring optical system shown in FIG. 4 is structured as a fluorescent microscope using epi-illumination. In such a fluorescent microscope, a micro image acquired by the micro image acquiring unit 30 is a fluorescent observing image through fluorescence from the sample S. On the light path between the sample S and the image pickup device 31, or on the light path between the excitation light source 36 and the dichroic mirror 37, an optical filter for selecting exciting light or fluorescence may be provided as appropriate.

With respect to the objective lens 32, a Z stage 33 using a stepping motor or a piezo-actuator is provided, and by driving the objective lens 32 in the Z-axis direction by this Z stage 33, focusing on the sample S can be performed. As the image pickup device 31 in this micro image acquiring unit 30, an image pickup device capable of acquiring a two-dimensional image and TDI driving can also be used as well as the image pickup device capable of acquiring a one-dimensional image.

As this micro image acquiring image pickup device 31, for example, an image pickup device such as a 3-CCD camera capable of acquiring a color image is preferably used. As the macro image acquiring image pickup device 21, either a monochrome image acquiring image pickup device or an image pickup device capable of acquiring a color image can be used as appropriate. As the image pickup device 31, when acquisition of a color image is not necessary, a monochrome image acquiring image pickup device can also be used.

With respect to the sample stage 15, the macro image acquiring unit 20, the micro image acquiring unit 30, light sources 26 and 27 as the macro light sources 25, and the light source 36 as the micro light source 35, as control means for controlling the driving of these, a stage control unit 41, a macro image pickup control unit 42, a micro image pickup control unit 43, a macro light source control unit 44, and a micro light source control unit 45 are provided. The stage control unit 41 sets and adjusts the image pickup conditions for the sample S by controlling the driving of the sample stage 15 as an XY stage and the Z stage 33.

The macro image pickup control unit 42 controls macro image acquisition from the sample S by controlling the driving of the image acquiring unit 20 including the macro image pickup device 21. The micro image pickup control unit 43 controls micro image acquisition from the sample S by controlling the driving of the image acquiring unit 30 including the micro image pickup device 31. The macro light source control unit 44 controls light irradiation when acquiring a dark field macro image and a bright field macro image of the sample S by controlling the driving of the dark field light source 26 and the bright field light source 27. The micro light source control unit 45 controls light (exciting light) irradiation when acquiring a micro image (fluorescent observing image in this embodiment) of the sample S by controlling the driving of the excitation light source 36.

The control device 60 includes an image acquisition control unit including a macro image acquisition control unit 61 and a micro image acquisition control unit 62, an image data processing unit including a macro image processing unit 66 and a micro image processing unit 67, and an image pickup condition setting unit 65. The image acquisition control unit controls an operation for acquiring an image of a sample S in the microscope system 10 via the control units 41 through 45 described above.

In the image data processing unit, image data of a macro image acquired by the image acquiring unit 20 and image data of a micro image acquired by the image acquiring unit 30 are inputted, and these image data are subjected to necessary data processing. Image data inputted into the image data processing unit, various data and information obtained by processing the image data, or control information to be used by the image acquisition control unit are stored and held in the data storage unit as appropriate.

In detail, the macro image acquisition control unit 61 of the image acquisition control unit controls an operation for setting a position for acquiring a macro image of a sample S, an operation for acquiring a macro image by the macro image acquiring unit 20, an operation for radiating light for acquiring a dark field macro image by the dark field light source 26, and operation for radiating light for acquiring a bright field macro image by the bright field light source 27 via the stage control unit 41, the macro image pickup control unit 42, and the macro light source control unit 44.

The micro image acquisition control unit 62 controls an operation for setting a position for acquiring a micro image of a sample S, an operation for acquiring a micro image by the micro image acquiring unit 30, and an operation for radiating light for acquiring a micro image by the micro light source 35 via the stage control unit 41, the micro image pickup control unit 43 and the micro light source control unit 45. The micro image acquisition control unit 62 controls acquisition of a micro image of the sample S by referring to the image pickup condition set by the image pickup condition setting unit 65 described later.

In the macro image processing unit 66, image data of a macro image of the sample S acquired by the image pickup device 21 of the macro image acquiring unit 20 is inputted via the macro image pickup control unit 42. This image processing unit 66 executes necessary data processing such as correction, processing, and storing of image data of the inputted macro image. In this embodiment, the macro image processing unit 66 has a function to generate a reference macro image by applying predetermined processing to the image data of the macro image.

In the micro image processing unit 67, image data of a micro image of the sample S acquired by the image pickup device 31 of the micro image acquiring unit 30 is inputted through the micro image pickup control unit 43. This image processing unit 67 applies necessary data processing such as correction, processing, and storing to the image data of the inputted micro image similarly in the image processing unit 66. In this embodiment, the micro image processing unit 67 has a function to prepare sample data as image data with high resolution of the target sample S by using the image data of the acquired micro image.

The image pickup condition setting unit 65 is setting means for setting an image pickup condition of a micro image by referring to the macro image of the sample S acquired by the macro image acquiring unit 20 of the microscope system 10. In this embodiment, into this image pickup condition setting unit 65, a reference macro image generated by processing the image data of the macro image is inputted from the macro image processing unit 66. The image pickup condition setting unit 65 sets an image acquiring range corresponding to a range including an object of image acquisition as an image pickup condition of a micro image of the sample S by referring to this reference macro image. Alternatively, the image pickup condition setting unit 65 sets other image pickup conditions, for example, focus related information such as a focus measuring position for executing focusing and focus information concerning image acquisition of an object in the image acquiring range as appropriate.

Herein, acquisition of the macro image and the micro image of the sample S in the image acquiring units 20 and 30 will be described. In the macro image acquiring unit 20, a macro image as a whole image of the sample S to be used for setting image pickup conditions of a micro image is acquired. For example, when supposing that a slide (preparation) in which a biological sample such as a tissue slice is sealed in a slide glass is used as the sample S, as a macro image, an image of the whole slide or an image in a predetermined range including the biological sample is acquired.

In the image acquiring apparatus structured as shown in FIG. 2 through FIG. 4, for acquisition of a macro image, oblique illumination using the dark field light source 26 disposed obliquely below the sample S or transmitted illumination using the bright field light source 27 disposed below the sample S are properly selected and used according to the type of the target sample S or the type of the macro image to be acquired. Thereby, this image acquiring apparatus is capable of acquiring both of a dark field macro image and a bright field macro image as macro images of the sample S.

In the micro image acquiring unit 30, a micro image of the sample S at target resolution is acquired with reference to the set image pickup condition. Preferably, this micro image acquisition is performed by two-dimensionally scanning the sample S at a predetermined resolution higher than that of the macro image as schematically shown in FIG. 5(a). Herein, in the micro image acquisition using the image pickup device 31 such as a one-dimensional CCD camera, in an XY plane parallel to the sample S, the longitudinal direction of an image pickup plane of the image pickup device 31 is defined as an X-axis direction, and a direction orthogonal to this longitudinal direction is defined as a Y-axis direction. In this case, in the micro image acquisition, the direction orthogonal to the longitudinal direction of the image pickup plane in the image pickup device 31, that is, the negative direction of the Y axis in FIG. 5(a) is the direction to scan the sample S.

In the micro image acquisition using the image pickup device 31 such as a one-dimensional CCD camera, first, the sample S on the sample stage 15 is scanned in the scanning direction (negative direction of the Y axis) by the image pickup device 31 to acquire a strip-like partial image A with the desired resolution. Furthermore, as shown in FIG. 5(a), a plurality of partial images A, B, . . . , I are acquired by repeating a plurality of times this partial image acquisition while changing the image pickup position along the longitudinal direction (positive direction of the X axis) of the image pickup plane.

By arranging partial images A through I thus obtained in the X-axis direction and combining these, the whole micro image of the sample S can be generated. By such a micro image acquiring method, it is possible to preferably acquire image data of the sample S at sufficiently high resolution. In FIG. 5(a), the hatched region in the partial image A, whose longitudinal direction is along the X-axis direction, shows an image pickup region corresponding to the image pickup plane in the image pickup device 31.

To set image pickup conditions of a micro image, it is preferable that an image acquiring range and focus measuring position are set as image pickup conditions of a micro image with reference to the macro image acquired by the image pickup device 21 of the macro image acquiring unit 20. Thereby, it becomes possible that parameters to be used for acquiring a micro image are preferably set from information obtained from a macro image such as a dark field macro image or a bright field macro image as a whole image of the sample S and satisfactory image data with high resolution of the sample is acquired.

In detail, when a slide is set as a sample S as described above, as shown in FIG. 5(b), the image acquiring range with respect to the sample S can be set to a rectangular range R including a biological sample L in the slide as an object of image acquisition. Two-dimensional scanning of the sample S in the micro image acquiring unit 30 (see FIG. 5(a)) is performed within the image acquiring range R thus set.

The focus measuring position is used, in the micro image acquiring unit 30, when acquiring focus information with respect to the sample S prior to acquisition of the micro image of the sample S. In the micro image acquiring unit 30, focus measurement is performed by using the image pickup device 31 at a set focus measuring position to determine a focus position as focus information on acquisition of the micro image of the sample S. Such setting of the focus measuring position and acquisition and setting of focus information are executed by the image pickup condition setting unit 65, if necessary, via the micro image acquisition control unit 62, etc.

The focus measuring position for acquiring focus information is set to one focus measuring position with respect to the sample S when, for example, inclination of the sample S in a horizontal plane, that is, deviation of the focus position in a horizontal plane does not pose a problem. When it is necessary to consider deviation of the focus position in a horizontal plane, it is preferable that three or more focus measuring positions are set with respect to the sample S. By thus performing focus measurement upon setting three or more focus measuring positions, a two-dimensional focus map with respect to the image acquiring range R of the sample S can be obtained.

For example, when a focus map with regard to the focus position is determined as a planar focal plane, a focal plane can be determined from a plane including measurement result points at three focus measuring positions. When four or more focus measuring positions are used, a focal plane can be determined by using a fitting method such as the least square method from measurement result points thereof.

FIG. 5(b) shows an example of setting of the focus measuring positions by using a macro image in the case where nine focus measuring positions are automatically set. In this case, the image acquiring range R set in advance for the sample S is equally divided by 3×3=9, and nine focus measuring positions P are set to center points of the respective divided regions.

In this case, 8 points of the nine focus measuring positions are initially set points included in the range of the biological sample L as an object of image acquisition, so that they are set as focus measuring positions without change. On the other hand, the lower left point is out of the range of the biological sample L, and it cannot be set as the focus measuring position as it is. Therefore, this lower left focus measuring position may be set to, for example, a position Q determined by a method in which it is moved toward the center of the image acquiring range R. Alternatively, such a position may be excluded from the focus measuring positions.

In the case of determining a focal plane by using the least square method from four or more focus measuring positions, when the focus measuring positions include a measuring position excessively distant from the focal plane determined from the focus measuring positions, it is preferable that a focal plane is re-determined by excluding this distant measuring position. When the focal plane cannot be normally determined, it is preferable that the object is regarded as dust and excluded.

As in the example described above, when the sample S is a slide, as the image pickup conditions for acquiring a micro image, preferably, first, an image acquiring range R including a biological sample L and a predetermined number of focus measuring positions P are set as the image pickup conditions of a micro image by referring to a macro image acquired by the macro image acquiring unit 20. Then, focus information about a focus position or focal plane on the sample S is acquired based on the focus measuring positions P in the micro image acquiring unit 30, and based on the image pickup conditions of the obtained focus information and the set image acquiring range R, etc., a micro image of the sample S is acquired.

For setting the image acquiring range R and the focus measuring positions P by using the macro image of the sample S, in detail, various methods may be used as well as the example shown in FIG. 5(b). For example, FIG. 5(b) shows an example in which the focus measuring positions P are set automatically by using a predetermined setting algorithm, however, to manually set the focus measuring positions, an appropriate number and arrangement of focus measuring positions may be set after an operator confirms the macro image.

Figure 5:
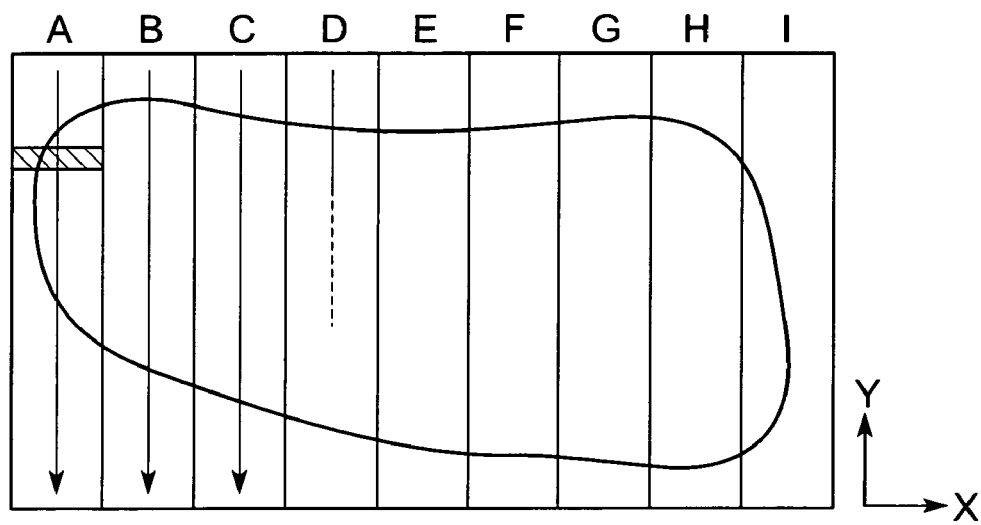
FIG. 5 is a figure with drawings schematically showing a method for acquiring an image of a sample.
Figure 5:
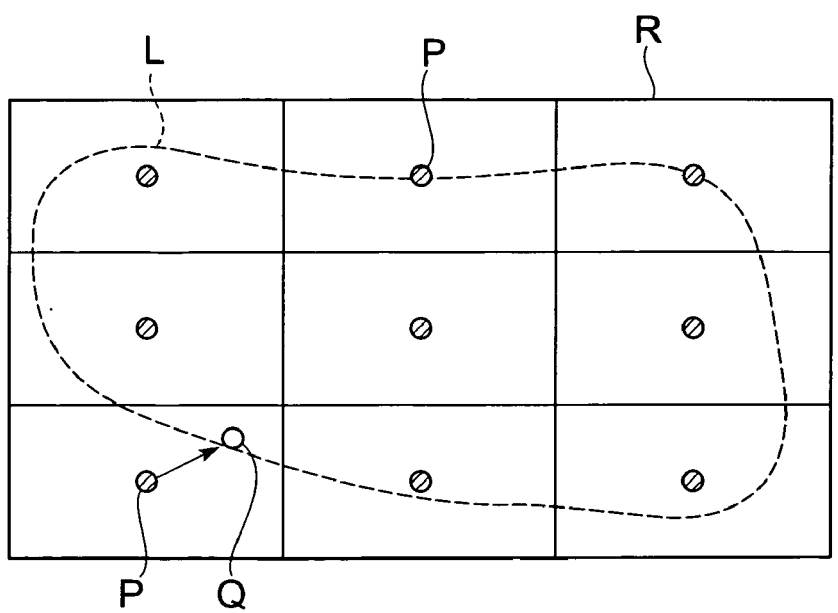
Figure 6:
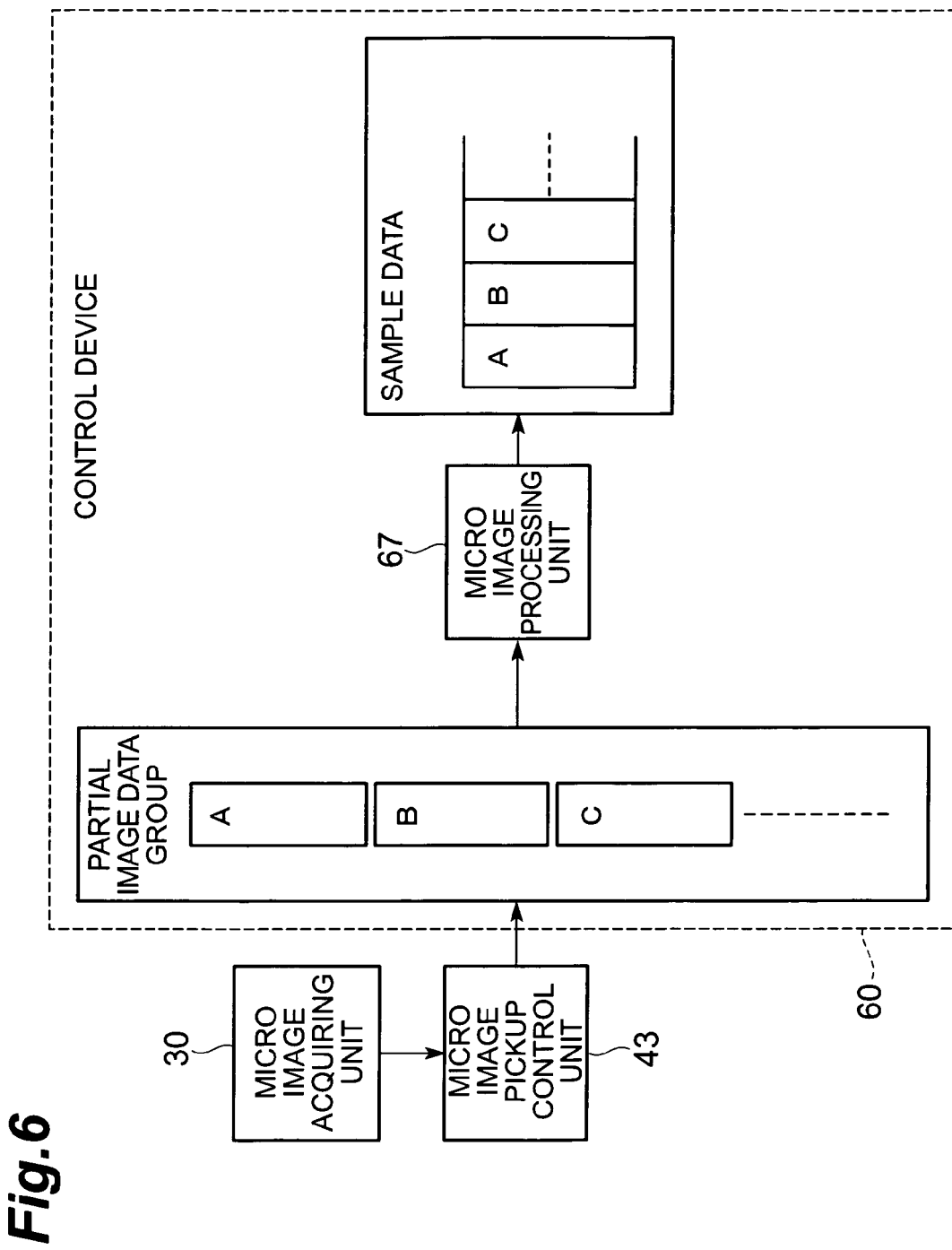
FIG. 6 is a drawing schematically showing preparation of sample data using a micro image.

Preparation of image data of the sample S in the micro image processing unit 67 is performed as shown in FIG. 6 based on, for example, the plurality of partial images A, B, . . . , I shown in FIG. 5(a). In this case, as image data of the micro image acquired by the micro image acquiring unit 30, an image data group of the strip-like partial images A, B, C, . . . are inputted into the control device 60. The micro image processing unit 67 arranges and combines these partial images to generate image data as a micro image of the whole sample S, and uses this as sample data. This sample data can be used as, for example, image data in a virtual microscope. The image data of the sample S may be compressed as appropriate.

Figure 7:
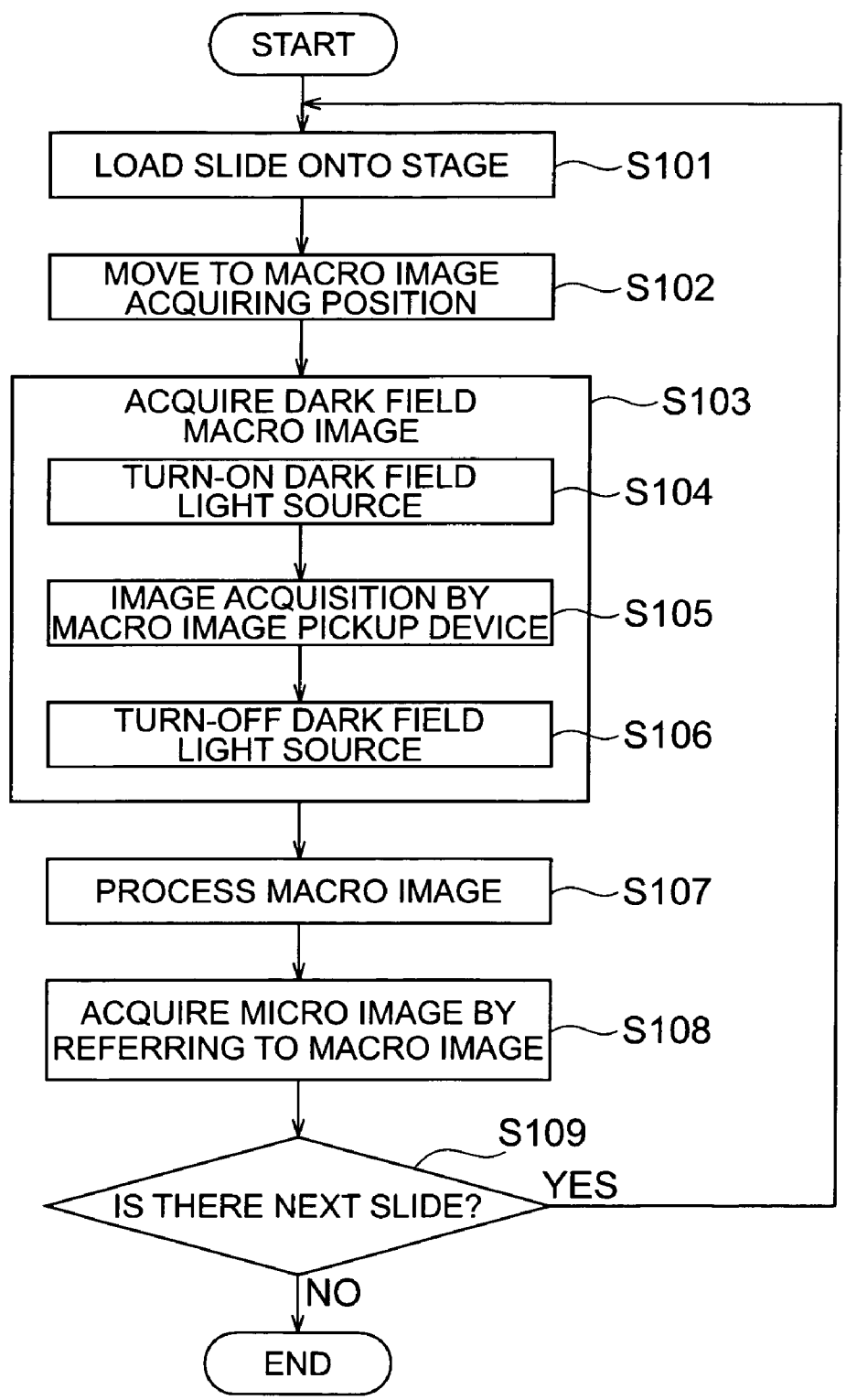
FIG. 7 is a flowchart showing an example of an image acquiring method.
Figure 8:
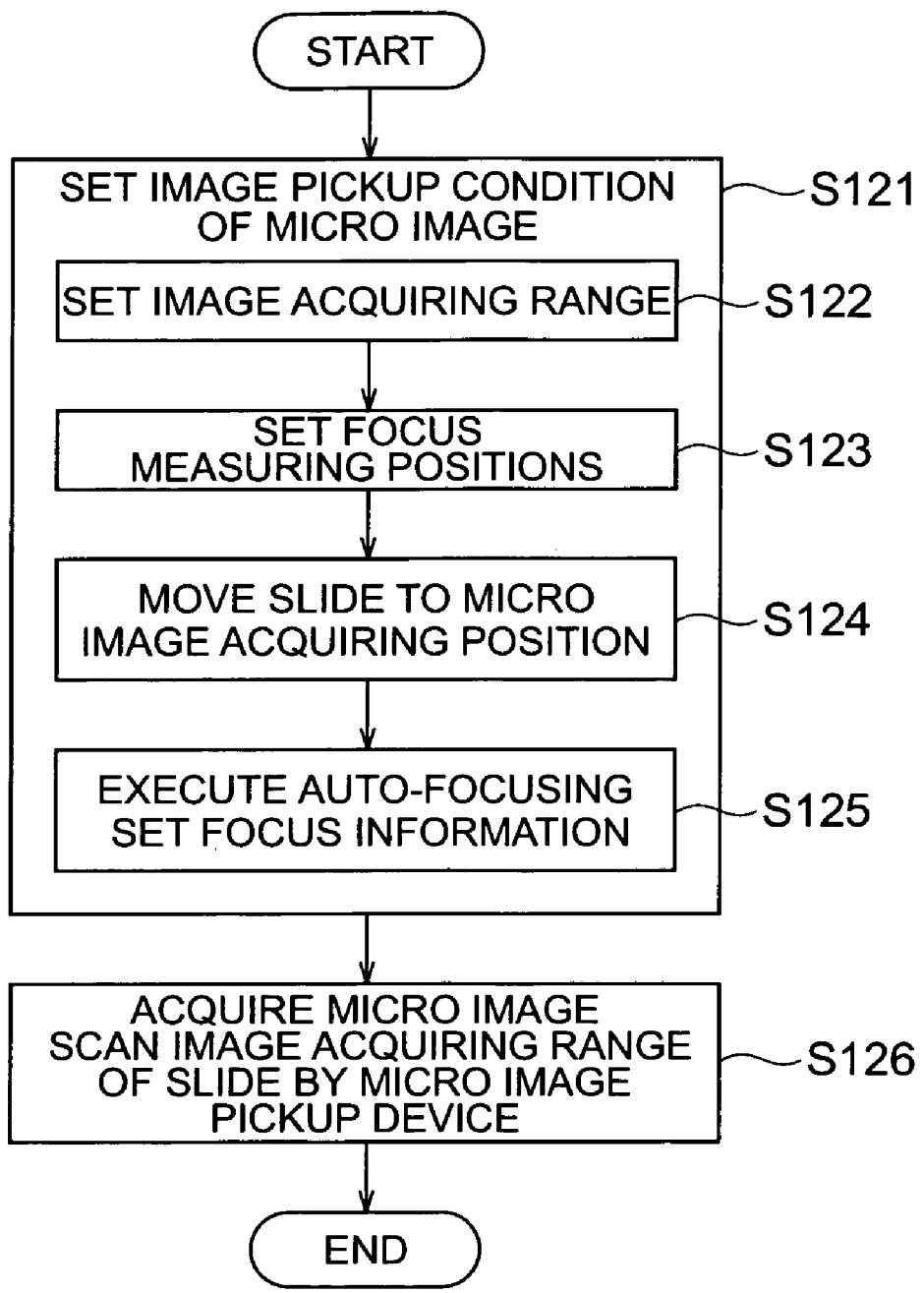
FIG. 8 is a flowchart showing an example of a method for acquiring a micro image.

The image acquiring method of the invention to be executed in the image acquiring apparatus shown in FIG. 1 through FIG. 4 will be further described. FIG. 7 is a flowchart showing an example of the image acquiring method. FIG. 8 is a flowchart showing an example of a method for acquiring a micro image in the image acquiring method shown in FIG. 7. In this example, a plurality of slides S are set in the sample storage unit 11 of the microscope system 10, and each of the slides S is used as a sample of an object of image acquisition. The number of slides which can be stored in the sample storage unit 11 is, for example, several hundred although this number is different depending on the detailed apparatus structure.

First, among the plurality of slides S, a slide S to be subjected to image acquisition is extracted from the sample storage unit 11, transferred by the sample transfer unit 14, and loaded to a predetermined position on the sample stage 15 (Step S101), and then the slide S is moved to the macro image acquiring position by controlling the driving of the sample stage 15 (S102). Then, a dark field macro image of the slide S including the biological sample L is acquired by the dark field light source 26 and the macro image acquiring unit 20 (S103, dark field macro image acquiring step).

In detail, to the slide S as an object of image acquisition, the dark field light source 26 set obliquely below the slide is turned on (S104). Then, in a state in that the slide S is irradiated with light of oblique illumination from the light source 26, a dark field macro image formed by scattered light from the slide S is acquired by the macro image pickup device 21 (S105). When the acquisition of the dark field macro image is finished, the dark field light source 26 is turned off (S106).

Image data of the dark field macro image acquired by the macro image acquiring unit 20 is inputted into the macro image processing unit 66 of the control device 60 via the macro image pickup control unit 42. The macro image processing unit 66 generates a reference macro image by applying predetermined processing suitable for the image pickup condition setting to the image data of the inputted macro image (S107, macro image processing step). Then, a fluorescent observing image as a micro image of the slide S is acquired by the excitation light source 36 as a micro light source and the micro image acquiring unit 30 by referring to the processed macro image (S108, micro image acquiring step).

The acquisition of the micro image of the slide S shown in Step S108 is performed by, for example, the method shown in the flowchart of FIG. 8. In this case, first, image pickup conditions of the micro image of the slide S are set in the image pickup condition setting unit 65 by referring to the reference macro image generated by the macro image processing unit 66 (S121, image pickup condition setting step). Then, by referring to the set image pickup conditions, the acquisition of the micro image of the slide S is executed by the micro image acquisition control unit 62 (S126, micro image acquisition control step).

In detail, as shown in FIG. 5(*b*), by referring to the reference macro image processed by the macro image processing unit 66, an image acquiring range R corresponding to a range including the biological sample L as an object of image acquisition is set as an image pickup condition of the micro image (S122), and furthermore, focus measuring positions P are set (S123). The setting of these image pickup conditions is manually performed by an operator or automatically performed by using a predetermined algorithm.

On the other hand, the slide S whose macro image has been completely acquired is moved from the image acquiring position in the macro image acquiring unit 20 by the sample transfer unit 14 or the sample stage 15, and placed at an image acquiring position in the micro image acquiring unit 30 (S124). Then, automatic focusing is executed by performing focus measurement for each of the set focus measuring positions P, and focus information about image acquisition of the biological sample L as an object in the image acquiring range R is acquired as an image pickup condition of the micro image (S125). This focus information is set according to, for example, a focal plane optimum for the image acquisition of the biological sample L.

When the setting of the image pickup conditions of the micro image by the image pickup condition setting unit 65 is finished, acquisition of the micro image of the slide S is executed by the image pickup device 31 of the image acquiring unit 30 by referring to the image pickup conditions (S126). Namely, by two-dimensionally scanning the slide S in the image acquiring range R by the image pickup device 31 while performing focus control based on the focal plane determined as focus information, a plurality of strip-like partial images are acquired. The plurality of partial images are converted into a micro image with high resolution of the slide S (for example, a digital slide in a virtual microscope) by being subjected to predetermined data combine processing in the micro image processing unit 67 of the control device 60.

Subsequently, the slide S whose micro image has been completely acquired is returned to the storage position in the sample storage unit 11 from the image acquiring position in the micro image acquiring unit 30 by the sample transfer unit 14. Then, as shown in FIG. 7, it is confirmed whether the plurality of slides S include a slide S to be subjected to image acquisition next which has not been subjected to the image acquisition processing (S109). At this point, when a slide S to be subjected to the image acquisition processing next is found, Steps S101 through S108 are repeated. On the other hand, in the case where all the slides S have been completely subjected to the image acquisition processing, the image acquisition from the plurality of slides S set in the sample storage unit 11 is finished.

The processing according to the image acquiring method to be executed in the image acquiring apparatus shown in FIG. 1 can be realized by an image acquiring program for making a computer execute the image acquisition processing. For example, the control device 60 in the image acquiring apparatus may include a CPU which operates each software program necessary for the image acquisition processing, a ROM in which the software program, etc., are stored, and a RAM in which data is temporarily stored during execution of the program. With this structure, the above-described image acquiring apparatus and image acquiring method can be realized by executing a predetermined image acquiring program by the CPU.

It is possible to record the program for making the CPU execute the processes for sample image acquisition on a computer-readable storage media and distribute these. These recording media include, for example, magnetic media such as hard disks and flexible disks, optical media such as CD-ROMs and DVD-ROMs, magnetic optical media such as floptical disks, and hardware devices such as RAMs, ROMs, and semiconductor nonvolatile memories exclusively installed so as to execute or store program commands.

Effects of the image acquiring apparatus, image acquiring method, and image acquiring program according to this embodiment will be described.

In the above-described image acquiring apparatus, image acquiring method, and image acquiring program, a macro image acquiring unit 20 is provided for the sample S as an object of image acquisition to acquire a macro image showing a whole image of the sample S. Then, by using a reference macro image obtained by applying predetermined processing to the macro image by the macro image processing unit 66, an image acquiring range as an image pickup condition to acquire a micro image is set by the image pickup condition setting unit 65. Thereby, for example, in the case of acquiring a micro image of a sample S which has resolution as high as enabling it to be handled as image data of the sample S to be used in a virtual microscope, the micro image can be acquired in a preferred range including an object (for example, a biological sample L in the slide S) by referring to the set image acquiring range.

Furthermore, in the acquisition of the macro image of the sample, the sample S is illuminated by using the dark field light source 26, and a dark field macro image is acquired by detecting scattered light of oblique illumination from the sample S. With the structure in which an image is thus acquired through scattered light from the sample S, even when the sample stained with, for example, a fluorescent dye is set as an object of image acquisition, the macro image of the sample S can be preferably acquired at a sufficient contrast. This macro image with a high contrast is effectively used for setting image pickup conditions such as the image acquiring range when acquiring a micro image, and it becomes possible to reliably set image pickup conditions of a micro image. This dark field macro image can be preferably used even when a sample stained with an absorptive dye is an object of image acquisition.

When a fluorescent observing image is acquired as a micro image of the sample S, as a micro image acquiring optical system, for example, as described above, a structure of a fluorescent microscope using epi-illumination shown in FIG. 4 can be used. As the structure of this micro image acquiring optical system, various structures may be used according to the type of the sample S and the type of the micro image to be acquired.

Figure 9:
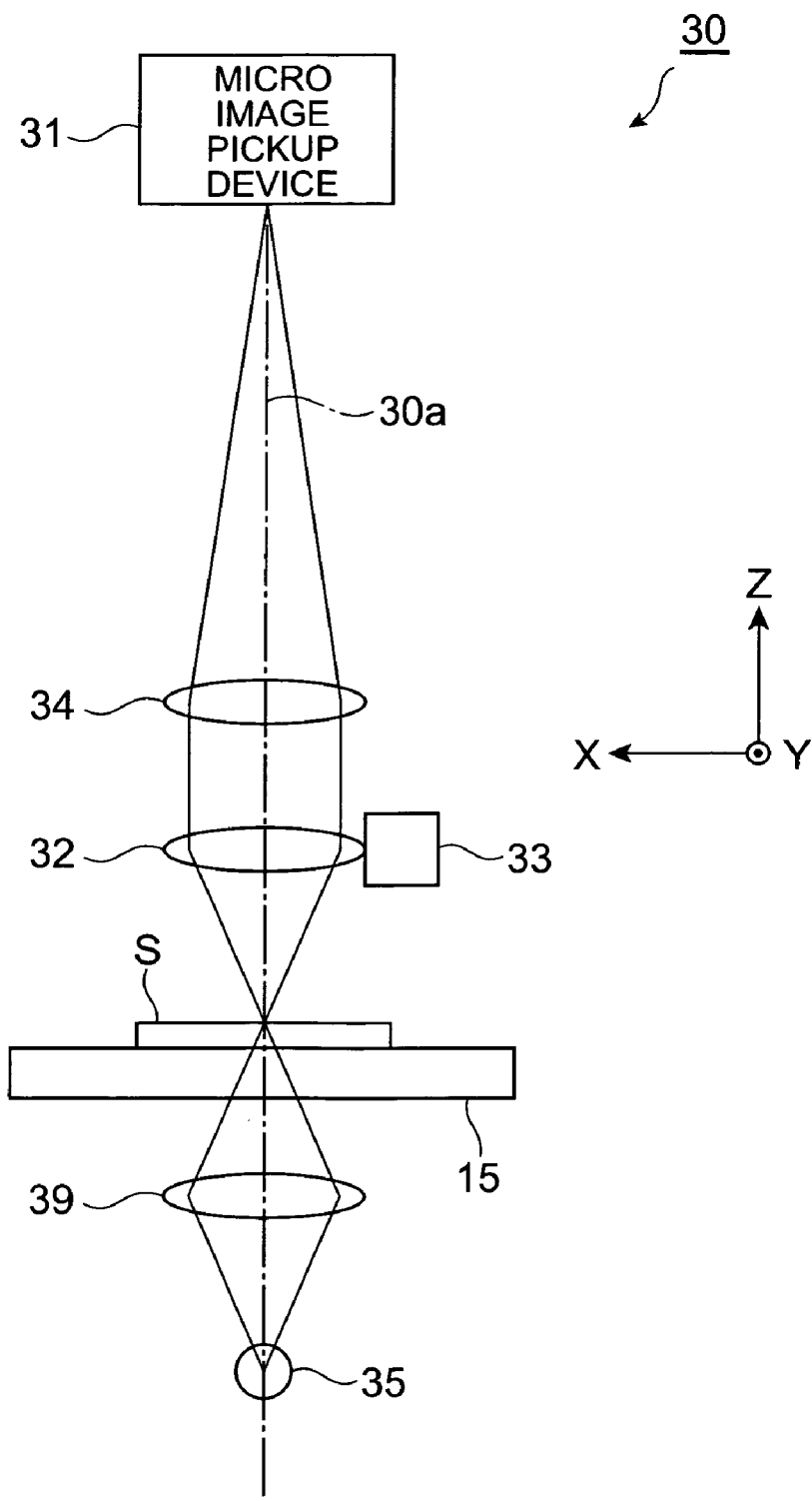
FIG. 9 is a drawing schematically showing another example of a structure of a micro image acquiring optical system.

An example of the micro image acquiring optical system for acquiring a transmitted observing image as a micro image of the sample S is shown in FIG. 9. In this example, as a micro light source 35 for radiating light for generating an optical image for micro image acquisition, a micro light source 35 for transmitted illumination set below the sample stage 15 together with a condenser lens 39 is used. As the structure of the micro image acquiring optical system, various structures such as a reflecting microscope for acquiring a reflected observing image, a differential interference microscope for acquiring a differential observing image, a phase difference microscope for acquiring a phase difference observing image, a polarizing microscope for acquiring a polarized observing image, and a dark field microscope for acquiring a dark field observing image, etc., can be used as well as a fluorescent microscope and a transmitted microscope.

Herein, as a detailed structure of a dark field illuminating means to be used to acquire a macro image, as shown in FIG. 3, it is preferable that the dark field light source 26 irradiates the sample S with light from the oblique lower side with respect to the optical axis 20*a* for acquiring a macro image. Generally, it is preferable that the dark field light source 26 irradiates the surface orthogonal to the optical axis for acquiring a macro image with light obliquely from the opposite side (the opposite side of the objective lens) of the macro image acquiring unit 20. It is also preferable that the dark field light source 26 irradiates the optical path for acquiring a macro image with light obliquely from the opposite side of the macro image acquiring unit 20. It is also preferable that the dark field light source 26 irradiates obliquely a surface of the sample stage opposite the surface facing the objective lens with light. With this structure, light scattered by the sample S such as a tissue slice is easily made incident on the objective lens, so that a dark field macro image of the sample can be preferably acquired as a bright image.

Figure 10:
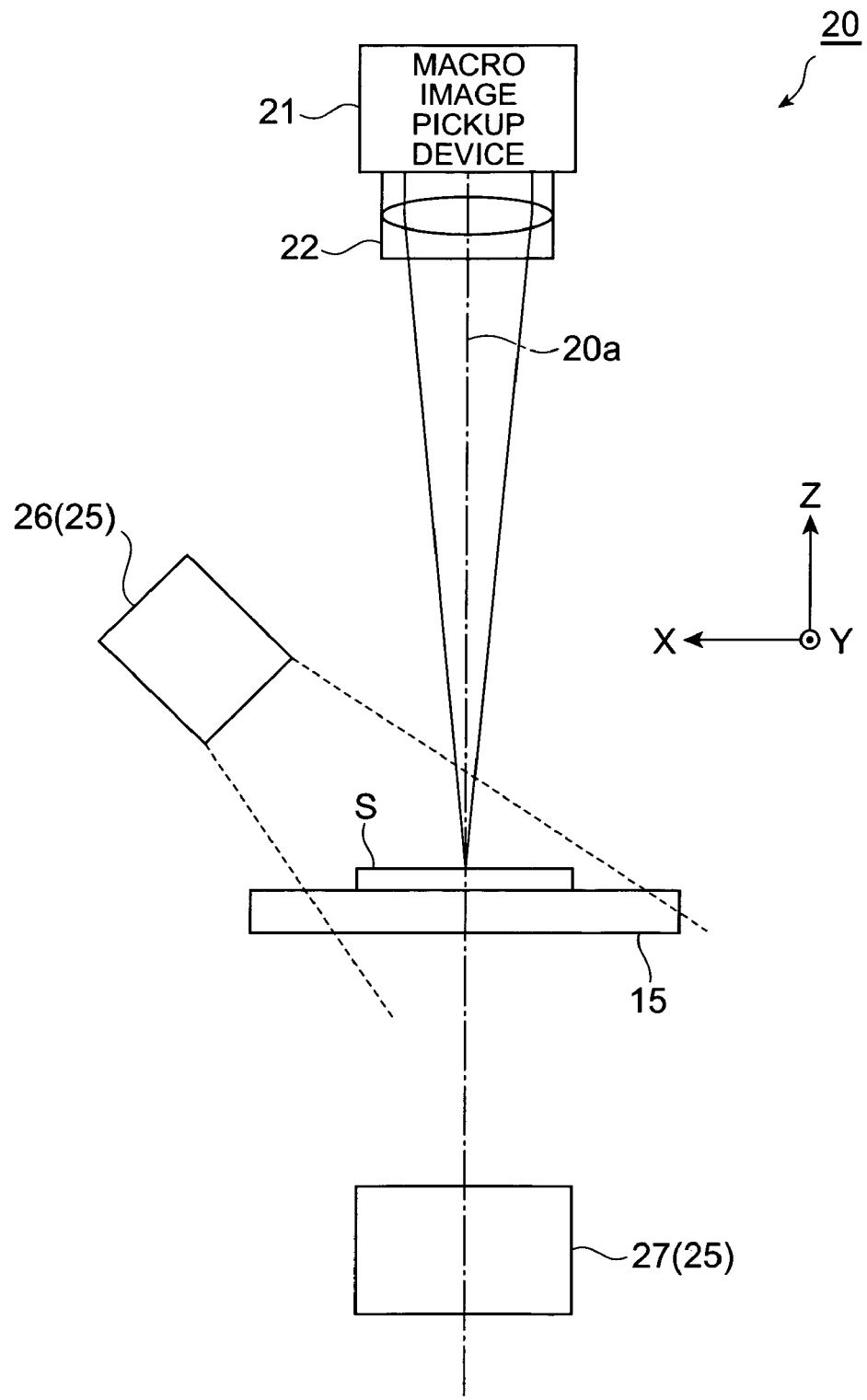
FIG. 10 is a drawing schematically showing another example of a structure of a macro image acquiring optical system.

Alternatively, as in another example shown in FIG. 10 of the structure of the macro image acquiring optical system, it is also possible that the dark field light source 26 has a structure to radiate light from the oblique upper side of the sample S with respect to the optical axis 20*a* for acquiring a macro image. Generally, it is also possible that the surface orthogonal to the optical axis for acquiring a macro image is irradiated with light obliquely from the macro image acquiring unit 20 side.

As a detailed example of oblique illumination, in a structure in which light from a xenon lamp is guided by an optical fiber and applied to the sample S, upon defining the transverse direction of the sample S as 0 degrees, light was applied from the oblique lower side of −45 degrees and −60 degrees and from the oblique upper side of +45 degrees and +60 degrees, and dark field macro images of the sample were obtained. In this case, due to illumination from the oblique lower side of −45 degrees through −60 degrees with respect to the sample S, an image including the sample S bright in the macro image was obtained. Even by illumination from the oblique upper side, a macro image in which the sample S was sufficiently discriminable was obtained although the image is darker than in the case of illumination from the oblique lower side.

In the above-described image acquiring apparatus, in addition to the macro image acquiring unit 20, a micro image acquiring unit 30 for acquiring a micro image of the sample S and a micro image acquisition control unit 62 for controlling a micro image acquiring operation by referring to set image pickup conditions are provided. By thus providing the macro image acquiring unit 20 and the micro image acquiring unit 30 and acquiring a micro image with high resolution upon setting image pickup conditions by referring to a macro image showing a whole image of the sample S, a micro image of the sample S can be efficiently acquired. With this structure, by acquiring a dark field macro image as a macro image of the sample S, for example, even when a sample S stained with a fluorescent dye is imaged, a macro image with a sufficient contrast of the sample S can be preferably acquired and image pickup conditions of a micro image can be reliably set.

As the macro light source 25 for the sample S, both the dark field light source 26 and the bright field light source 27 are installed in the structure of FIG. 2 and FIG. 3. With this structure, it becomes possible to acquire a macro image under various conditions such that the dark field light source 26 and the bright field light source 27 are switched according to the type of the sample S.

In the above-described image acquiring apparatus, in the image pickup condition setting unit 65, in addition to the image acquiring range, focus related information concerning the object image acquisition in the image acquiring range is also set as an image pickup condition of a micro image. Thereby, it becomes possible to acquire a micro image of the sample S under preferable conditions. Such focus related information includes, for example, one or a plurality of focus measuring positions in the image acquiring range. Alternatively, as the focus related information, focus information (for example, an image pickup focal plane) concerning the object image acquisition in the image acquiring range is set. When focus measuring positions are set, it is preferable that focus information such as an image pickup focal plane is acquired and set by referring to the result of focus measurement on the focus measuring positions.

Figure 11:
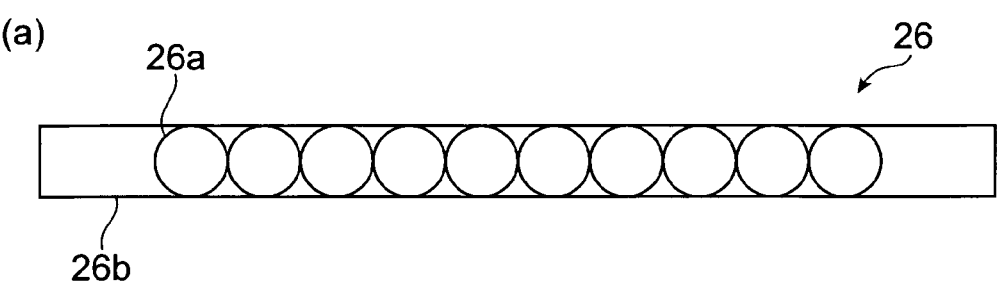
FIG. 11 is a drawing showing an example of a structure of a dark field light source.
Figure 11:
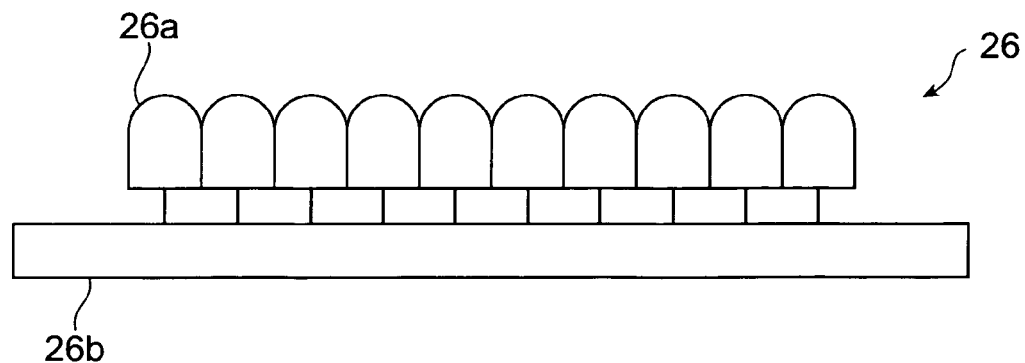

As the dark field light source 26 for acquiring a dark field macro image of the sample S, in detail, various light sources may be used, however, it is preferable that a light source which can supply light with directivity sufficient as dark field illumination is used. FIG. 11 is a figure with drawings showing an example of the structure of the dark field light source 26, and FIG. 11(*a*) is a top view, FIG. 11(*b*) is a side view. In this structure example, a plurality of LEDs 26*a* which supply light with directivity are arranged in line on the base member 26*b* extending in one direction to perform zonal illumination.

Figure 12:
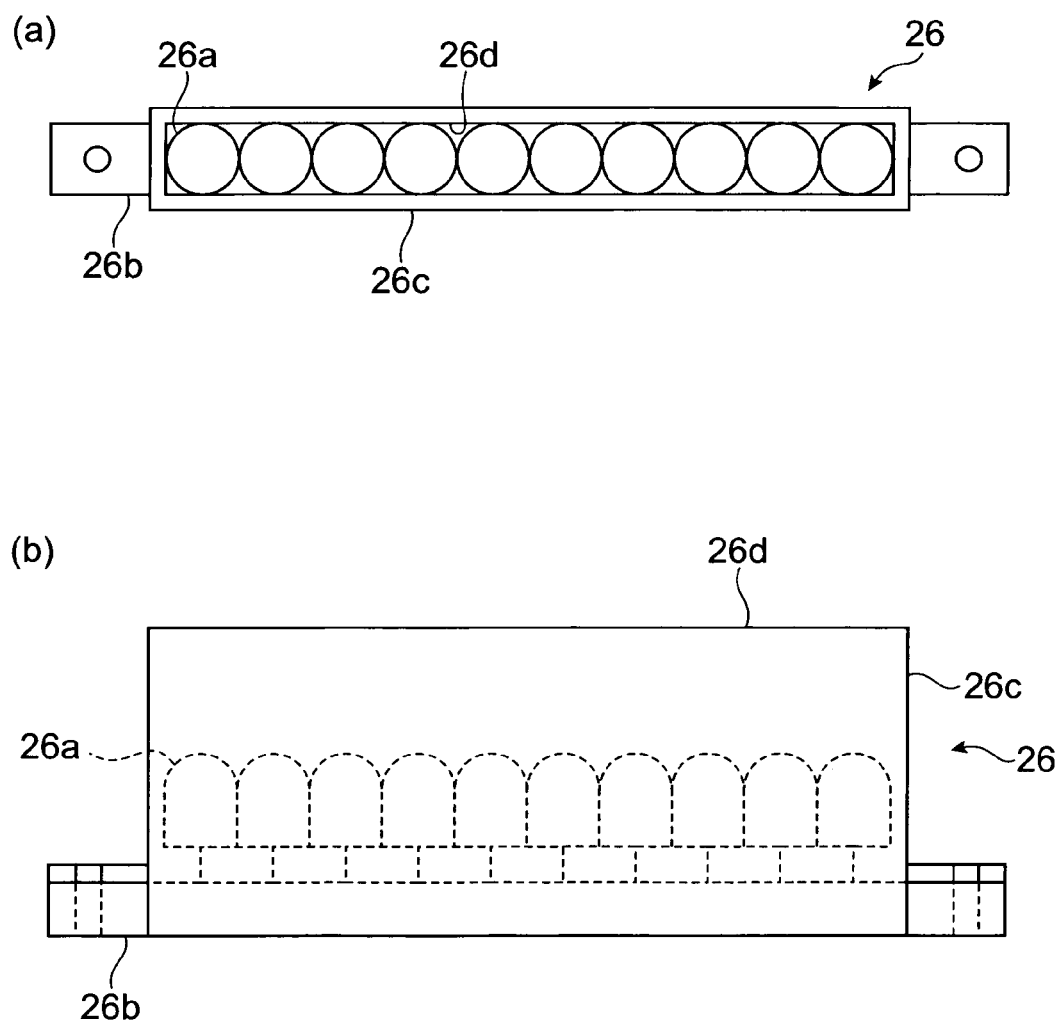
FIG. 12 is a drawing showing another example of a structure of a dark field light source.

FIG. 12 is a figure with drawings showing another example of the structure of the dark field light source 26. In this structure example, for the LEDs 26*a* arranged in line on the base member 26*b*, a cover member 26*c* is provided so as to cover the surrounding of the LEDs, and an opening 26*d* is provided in the cover member 26*c* in a light outgoing direction from the LEDs 26*a*. In this structure, the cover member 26*c* functions as a light guide member which improves the directivity of light to be applied to the sample S through the opening 26*d* from the LEDs 26*a*. This improvement in directivity of light of dark field illumination is effective for reducing optical noise in a dark field macro image. As the cover member 26*c*, specifically, for example, a member whose interior is white and whose exterior is black to suppress influence from stray light can be used. The dark field light source 26 shown in FIG. 11 and FIG. 12 is applicable in both structures of FIG. 3 and FIG. 10.

Figure 13:
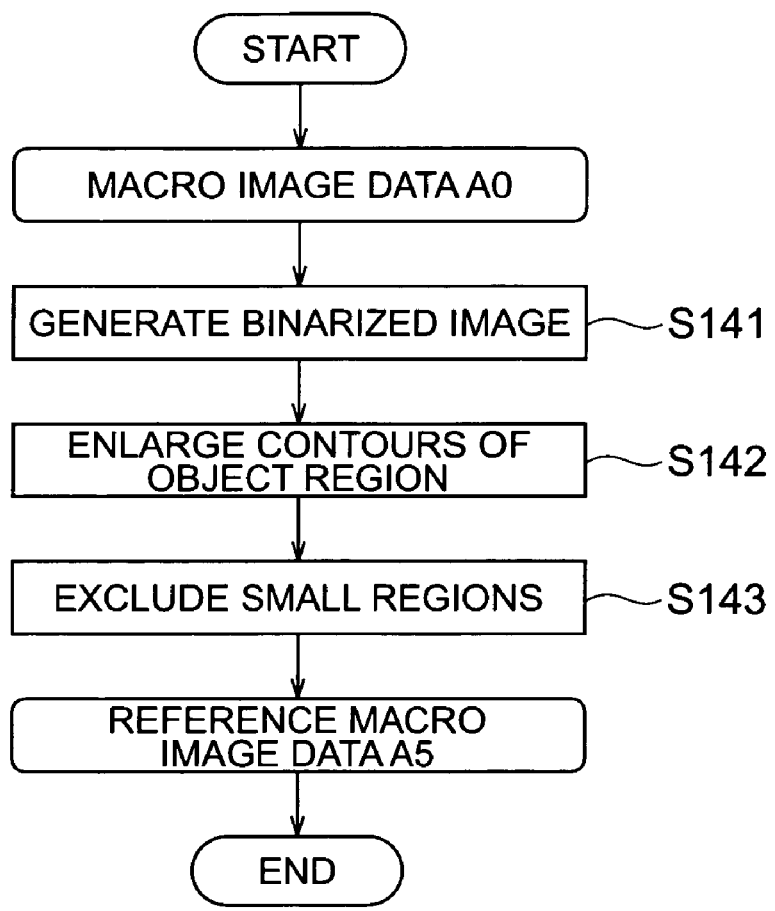
FIG. 13 is a flowchart showing an example of a method for processing a macro image.

For the processing (Step S107) of image data of a macro image in the image acquiring method shown in the flowchart of FIG. 7, for example, the method shown in FIG. 13 can be used. FIG. 13 is a flowchart showing an example of a macro image processing method. FIG. 14 through FIG. 17 are drawings showing the macro image processing method. This macro image processing is especially effective in the case of automatic setting of image pickup conditions of a micro image with reference to a macro image.

In the processing method shown in FIG. 13, image binarization by using a predetermined brightness threshold is applied to macro image data A0 acquired by the microscope system 10 in the macro image processing unit 66 (Step S141). In detail, as shown in the graph (a) of FIG. 14, a brightness threshold T is set for brightness distribution in the macro image. Then, the image is binarized by using this threshold T as a boundary, the macro image of the image (a) shown in FIG. 15 is processed into a binarized image of the image (b).

In this case, in the dark field macro image acquired in the above-described embodiment, scattered light is detected only in a region including the presence of the biological sample L as an object by means of the structure of oblique illumination. Therefore, when the brightness threshold T is set as described above, in the binarized image, an image portion (white) with brightness higher than the threshold T is discriminable as an object region that likely contains the presence of the object and an image portion (black) with brightness lower than the threshold T other than the object region is discriminable as a background region. By using such a binarized image, image pickup conditions such as an image acquiring range of a micro image can be preferably set.

Figure 14:
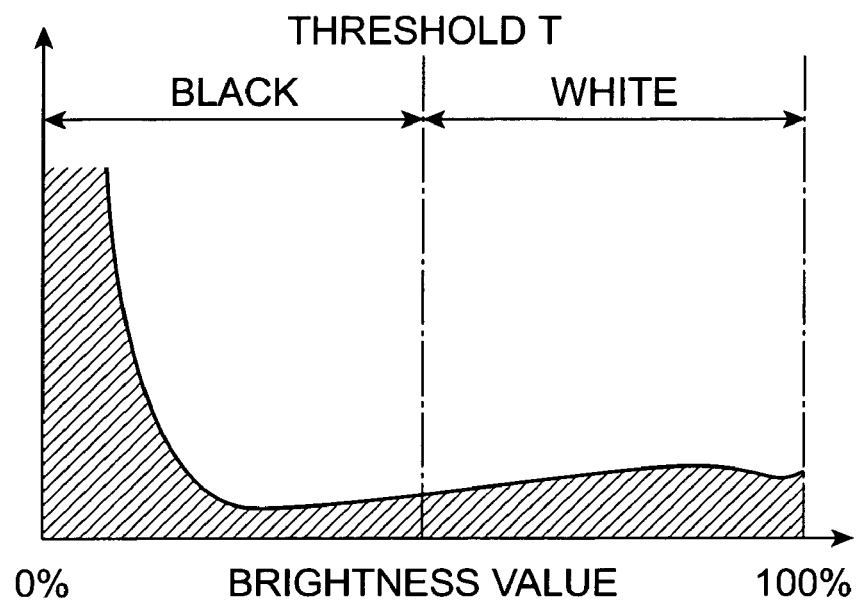
FIG. 14 is a figure with drawings showing a method for processing a macro image.
Figure 14:
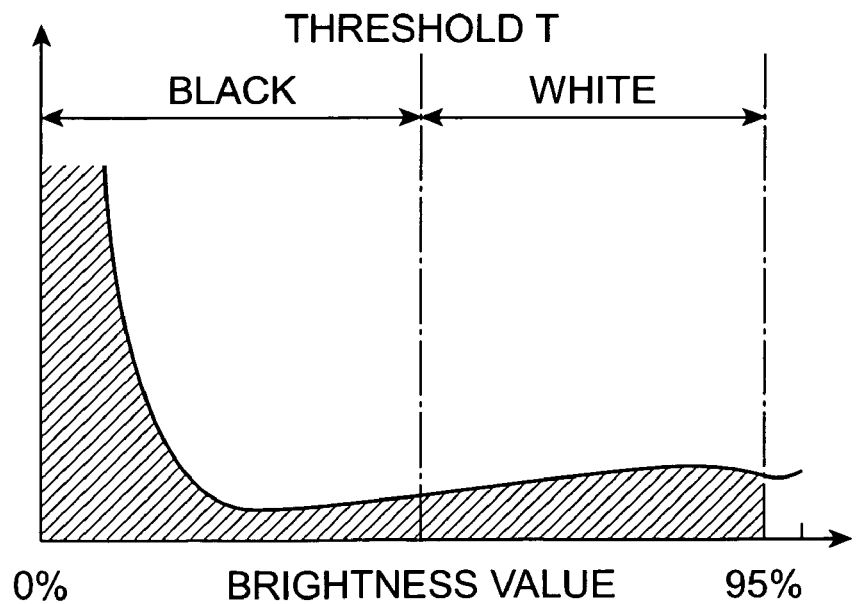
Figure 15:
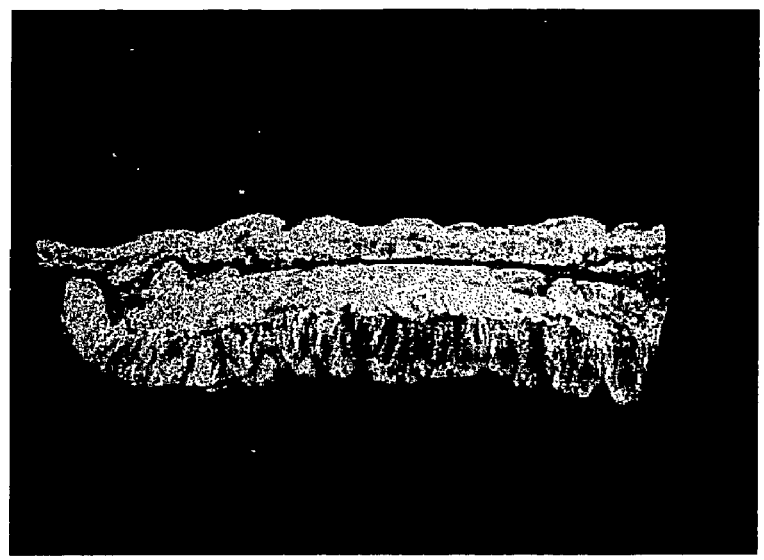
FIG. 15 is a figure with drawings showing a method for processing a macro image.
Figure 15:
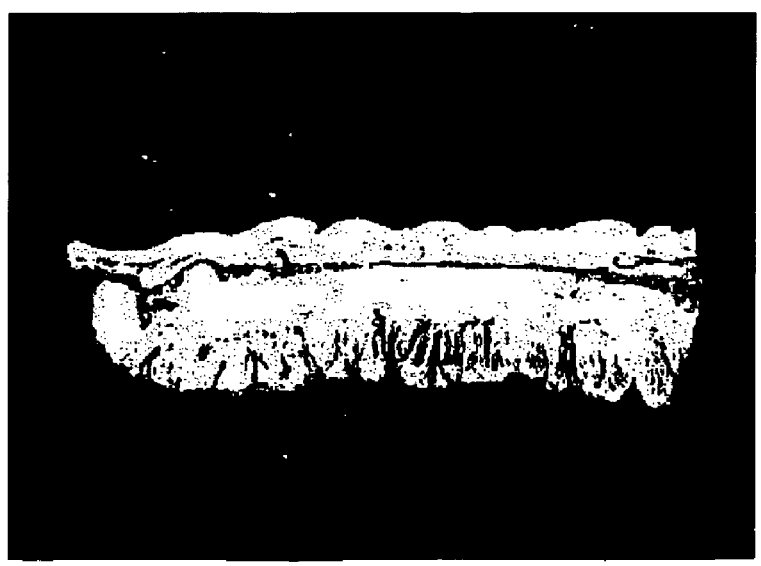

Concerning the setting of the brightness threshold with respect to the macro image, for example, as shown in the graph (a) of FIG. 14, the lowest brightness is set to 0% and the highest brightness is set to 100%, and the threshold T is set to an arbitrary brightness (for example, brightness of 50%) between the highest and lowest brightnesses. In this image binarization, as shown in the graph (b) of FIG. 14, by reducing the upper limit of binarization from 100% to 95%, etc., an image portion corresponding to minute amounts of dust causing saturation can be removed from the object region in the macro image. As in the case of the bright field macro image, when the bright and dark pattern is reversed in the image, the same processing is performed upon reversing, for example, the tone of the image.

Figure 16:
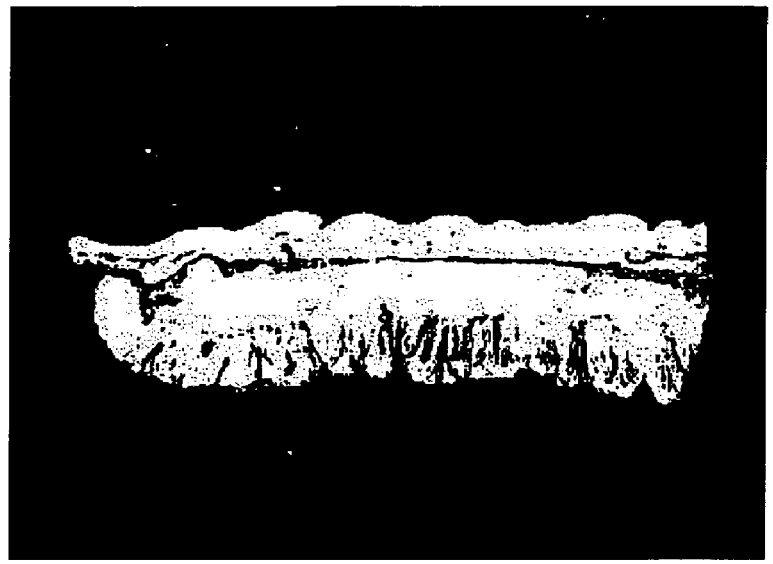
FIG. 16 is a figure with drawings showing a method for processing a macro image.
Figure 16:

Next, the binarized image is subjected to a processing for enlarging the contours of the object region to a predetermined amount (S142). Thereby, the binarized image of the image (a) of FIG. 16 is processed into an enlarged binarized image of the image (b).

Herein, when an object region including the presence of the object is discriminated from the macro image, an object in a complicated shape such as a shape whose contours are complicated or divided may be recognized as separate objects in the respective sections by mistake. On the other hand, by enlarging the contours of the object region, even when the object is in such a complicated shape, the number of object regions in the macro image or individual object regions in the macro image can be preferably discriminated.

Figure 17:
FIG. 17 is a figure with drawings showing a method for processing a macro image.
Figure 17:

The image subjected to the binarization and enlargement processing is subjected to processing for judging whether the object region includes small regions to be excluded by using a predetermined pixel number threshold (S143). Thereby, the enlarged binarized image of the image (a) of FIG. 17 is processed into a macro image of the image (b), and final reference macro image data A5 is obtained.

Herein, in the dark field macro image acquired by oblique illumination, an image of dust is enhanced due to scattered light even when the dust is small such as dust on the slide which does not pose a problem in transmitted illumination. On the other hand, by setting a pixel number threshold as a threshold of a size of the object region and by excluding small regions whose sizes are equal to or smaller than the pixel number threshold in the object region, an image portion of dust or the like in the macro image can be reliably excluded from the object region.

The image acquiring apparatus, the image acquiring method, and the image acquiring program of the invention will be further described.

Figure 18:
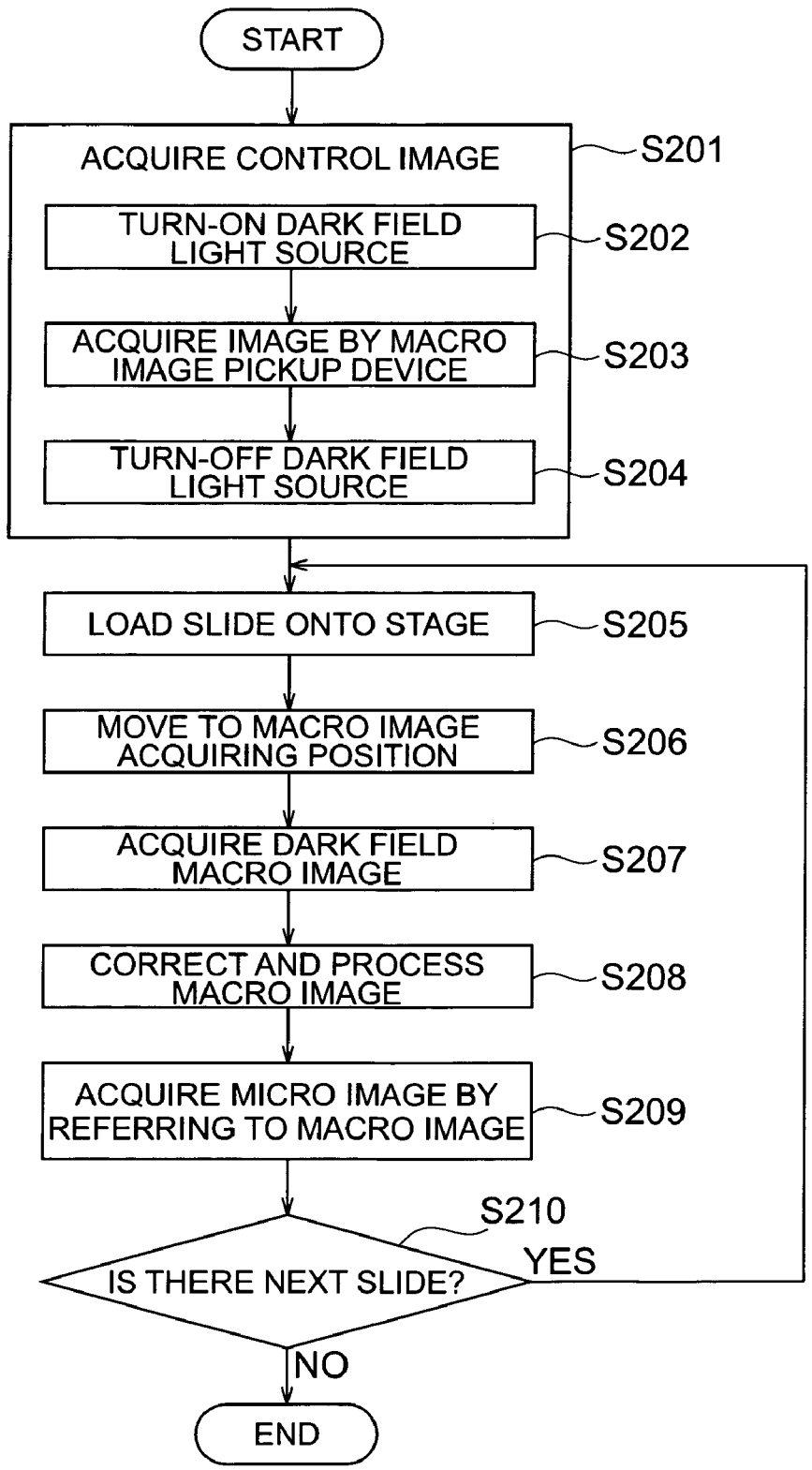
FIG. 18 is a flowchart showing another example of an image acquiring method.

FIG. 18 is a flowchart showing another example of the image acquiring method. This image acquiring method is different from the image acquiring method shown in FIG. 7 in the point that a control image is acquired previous to the acquisition of the macro image of the sample.

In this embodiment, first, a control image as a macro image without a sample is acquired (Step S201, control image acquiring step). In detail, a slide (blank slide) in which no biological sample L as an object of image acquisition is sealed is set on the sample stage 15, and for this blank slide, the dark field light source 26 set on the oblique lower side is turned on (S202). Then, in a state in that the blank slide is irradiated with light of oblique illumination from the light source 26, a dark field macro image of the blank slide is acquired by the macro image pickup device 21 (S203). This dark field macro image is a control image without the presence of the sample. When acquisition of the control image is finished, the dark field light source 26 is turned off (S204).

Next, a slide S the image of which is to be acquired is loaded on the sample stage 15 (S205), the driving of the sample stage 15 is controlled to move the slide S to the macro image acquiring position (S206). Then, a dark field macro image of the slide S including the biological sample L is acquired by the dark field light source 26 and the macro image acquiring unit 20 (S207).

Image data of the macro image acquired by the macro image acquiring unit 20 is inputted into the macro image processing unit 66 of the control device 60 via the macro image pickup control unit 42. The macro image processing unit 66 generates a reference macro image by applying predetermined correction and processing suitable for setting of image pickup conditions to image data of the inputted macro image (S208). Then, image pickup conditions are set with reference to the macro image subjected to the processing, and a micro image of the slide S is acquired by the micro light source 35 and the micro image acquiring unit 30 (S209).

Subsequently, the slide S whose image has been completely acquired is returned to the sample storage unit 11, and it is confirmed whether there is a slide S which has not been subjected to image acquisition processing (S210). Herein, when there is a slide S to be subjected to image acquisition processing, the steps S205 through S209 are repeated. On the other hand, when all the slides S have been completely subjected to image acquisition processing, image acquisition processing for a plurality of slides S set in the sample storage unit 11 is finished.

Figure 19:
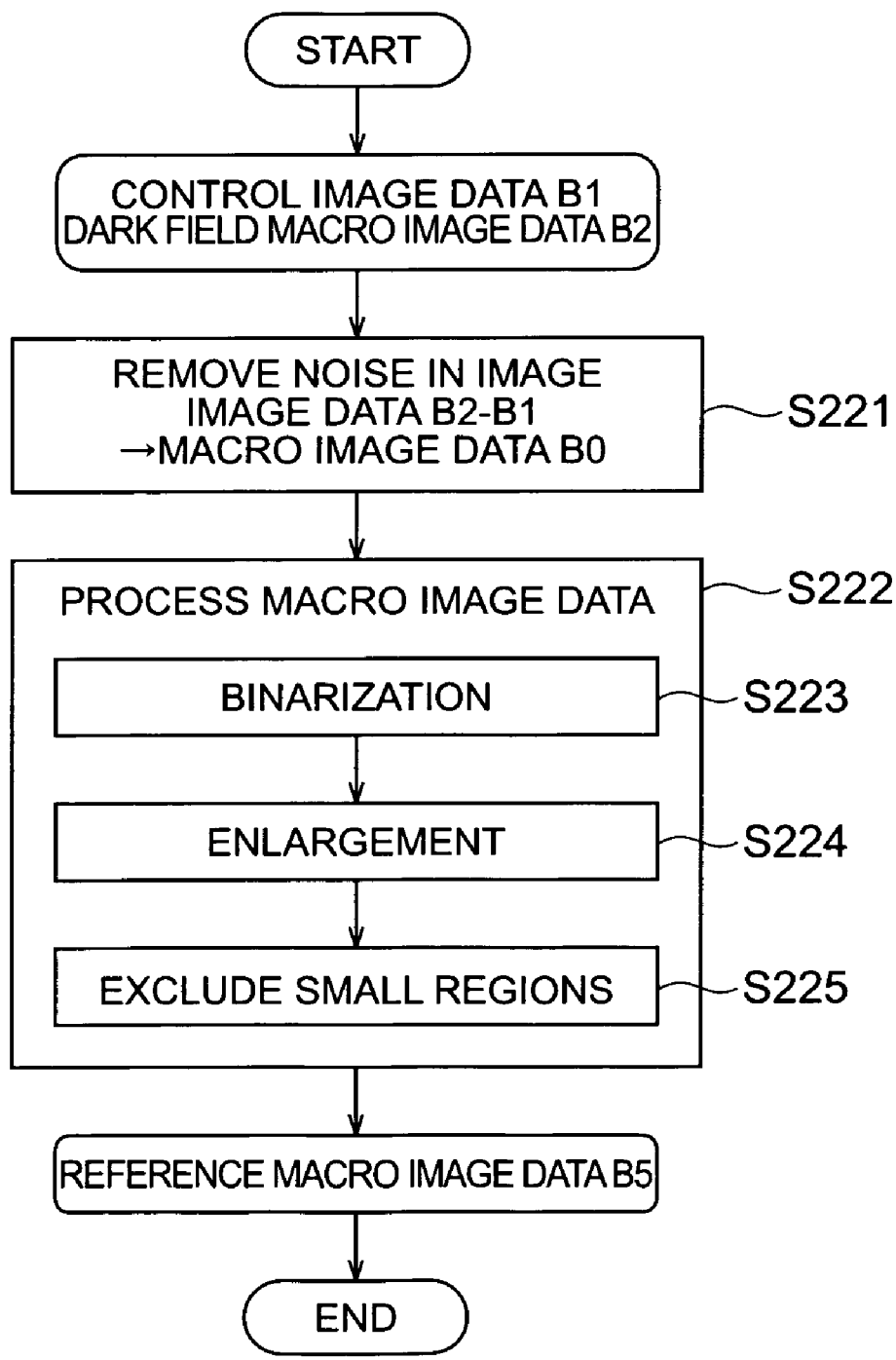
FIG. 19 is a flowchart showing another example of a method for processing a macro image.

FIG. 19 is a flowchart showing an example of a macro image processing method to be applied to the image acquiring method shown in FIG. 18. In this processing method, in the macro image processing unit 66, processing for removing noise in the image is performed by using the control image data B1 and the dark field macro image data B2 (S221).

In this case, in the dark field macro image to be acquired by oblique illumination, scattered light and reflected light are generated not only from the object of image acquisition such as the biological sample L but also from, for example, a slide glass and a sample stage, etc. When such light is detected, it becomes noise in the macro image and affects the discrimination of the object. On the other hand, by generating macro image data B0=B2−B1 by performing image arithmetic processing for subtracting the control image data B1 from the dark field macro image data B2, noise influence caused by something other than the object in the macro image can be removed.

Next, to the macro image data B0 obtained by performing the image arithmetic processing using the control image, in the macro image processing unit 66, necessary processing is applied (S222). In the processing method shown in FIG. 19, similar to the processing method shown in FIG. 13, binarization of the macro image (S223), enlargement of the contours of the object region (S224), and exclusion of small regions (S225) are performed. Thereby, final reference macro image data B5 is obtained.

Figure 20:
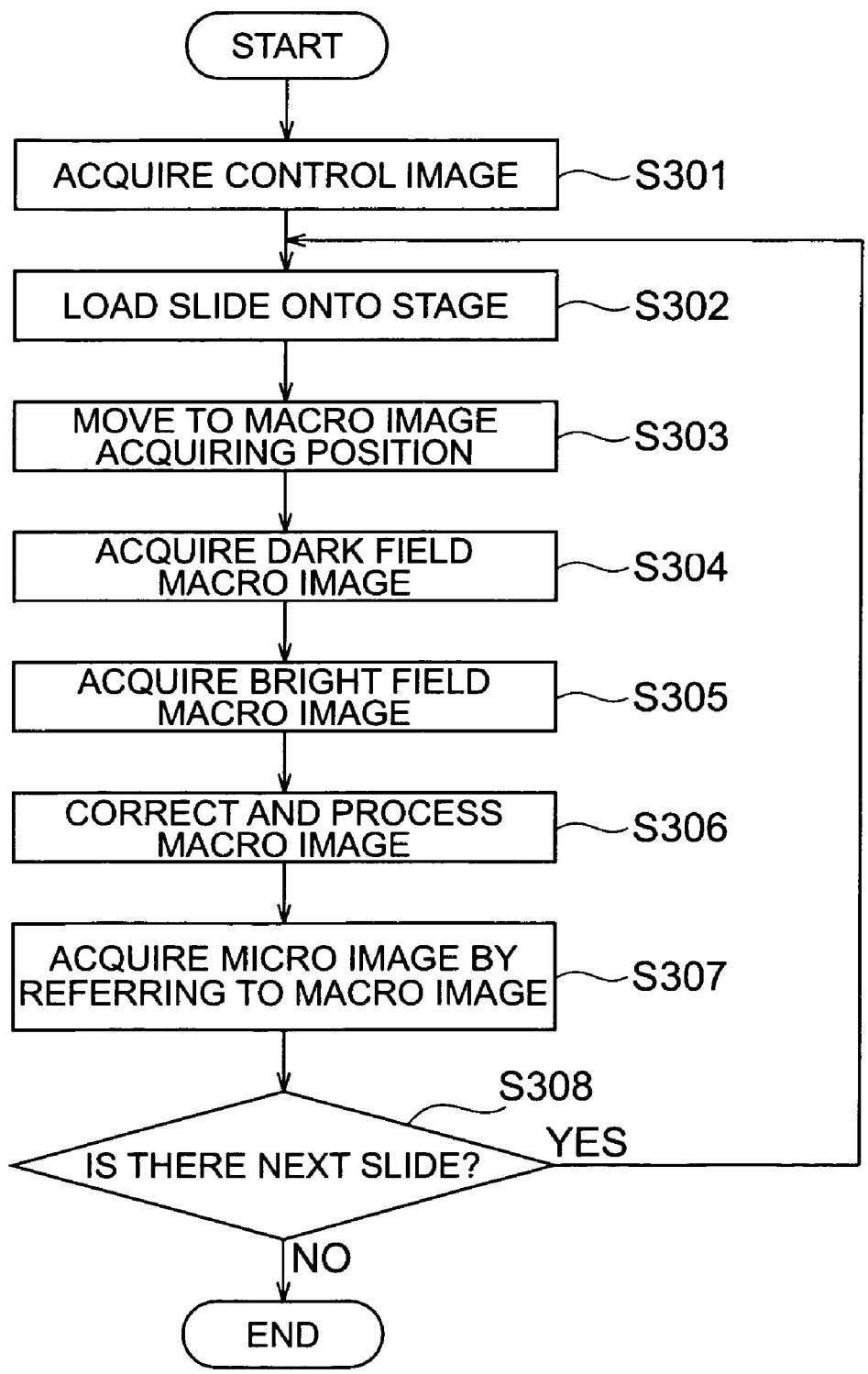
FIG. 20 is a flowchart showing another example of an image acquiring method.

FIG. 20 is a flowchart showing still another example of the image acquiring method. This image acquiring method is different from the image acquiring method shown in FIG. 18 in the point that a bright field macro image is acquired from the sample S in addition to the dark field macro image.

In this embodiment, first, a control image as a macro image without a sample is acquired (Step S301). Next, a slide S to be subjected to image acquiring is loaded onto the sample stage 15 (S302), the driving of the sample stage 15 is controlled to move the slide S to the macro image acquiring position (S303). Then, a dark field macro image of the slide S including biological sample L is acquired by the dark field light source 26 and the macro image acquiring unit 20 (S304). Furthermore, a bright field macro image of a slide S including biological sample L is acquired by the bright field light source 27 and the macro image acquiring unit 20 (S305, bright field macro image acquiring step).

Image data of the respective macro images acquired by the macro image acquiring unit 20 are inputted into the macro image processing unit 66 of the control device 60 via the macro image pickup control unit 42. The macro image processing unit 66 applies predetermined correction and processing suitable for the setting of image pickup conditions to the inputted image data of the macro image to generate a reference macro image (S306). Then, image pickup conditions are set by referring to the processed macro image, and a micro image of the slide S is acquired by the micro light source 35 and the micro image acquiring unit 30 (S307).

Subsequently, the slide S the image acquisition from which has been completed is returned to the sample storage unit 11, and it is confirmed whether there is a next slide S the image acquisition from which has not been completed (S308). At this point, when there is a slide S to be subjected to the image acquisition processing, Steps S302 through S307 are repeated. When image acquisition processing for all the slides S is finished, image acquisition for the plurality of slides S set in the sample storage unit 11 is finished.

Figure 21:
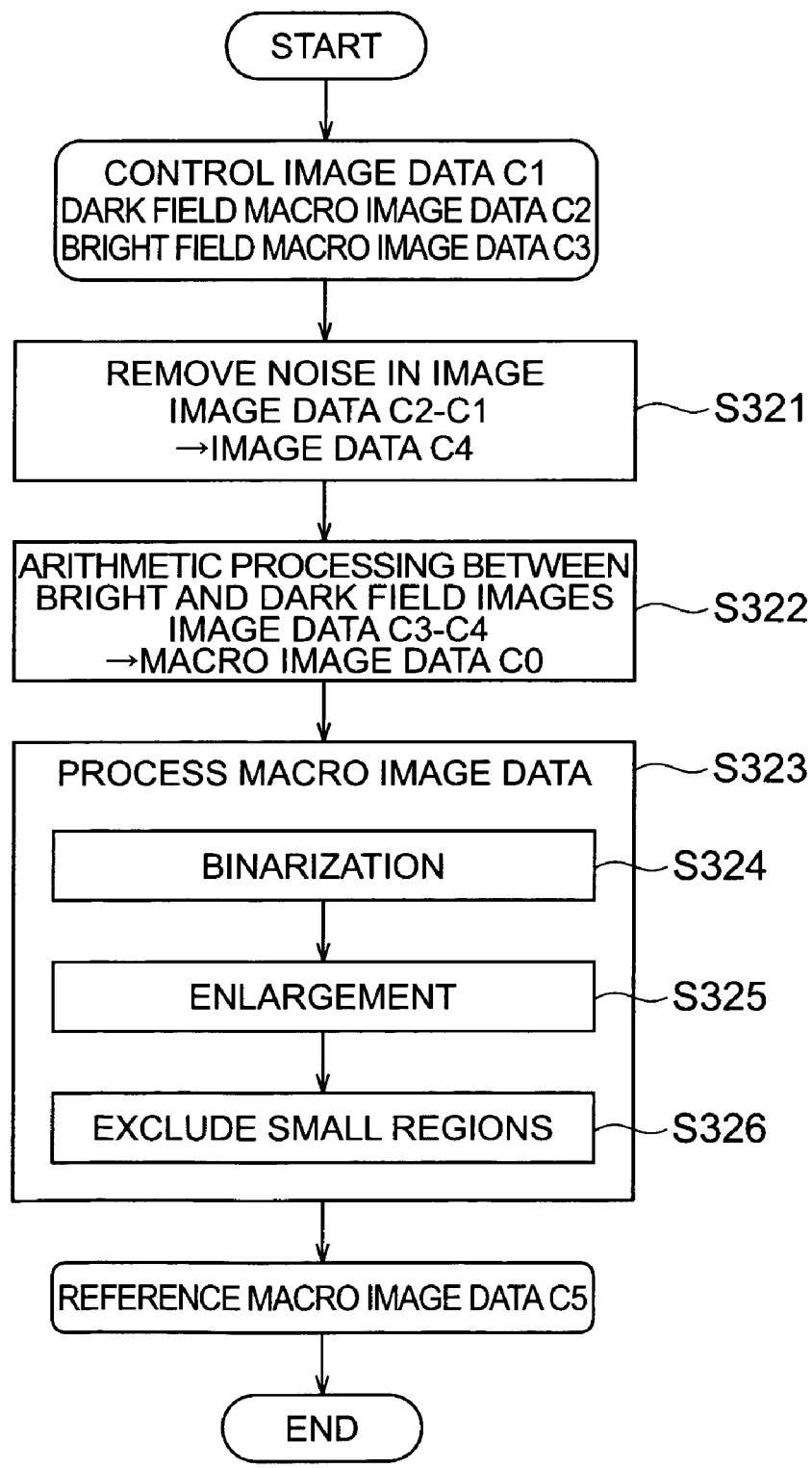
FIG. 21 is a flowchart showing another example of a method for processing a macro image.

FIG. 21 is a flowchart showing an example of a macro image processing method to be applied to the image acquiring method shown in FIG. 20. In this processing method, in the macro image processing unit 66, processing for removing noise in the image is performed by using the control image data C1 and the dark field macro image data C2 (S321). Namely, by generating macro image data C4=C2−C1 by performing image arithmetic processing for subtracting the control image data C1 from the dark field macro image data C2, noise influence due to something other than the object in the macro image can be removed.

Subsequently, predetermined image arithmetic processing is carried out by using the bright field macro image data C3 and the corrected dark field macro image data C4 in the macro image processing unit 66 (S322).

In this case, in the dark field macro image, an image of the sample S is acquired by means of scattered light from the sample S by oblique illumination, and for example, if the sample S is colored slightly, a part of illuminating light is absorbed by the sample S, so that scattered light is reduced, and the contrast of a resultant macro image may become low. On the other hand, by generating macro image data C0=C3−C4 by performing image arithmetic processing to subtract the dark field macro image data C4 as a scattered image from the bright field macro image data C3 as a transmitted image, the contrasts in these images are added, so that the contrast in the macro image can be improved. Such a method is effective, for example, for acquiring an image of a sample S faintly stained for transmitted light.

Next, in the macro image processing unit 66, necessary processing is applied to this macro image data C0 obtained through the image arithmetic processing using the control image and the bright field macro image (S323). In the processing method shown in FIG. 21, similarly to the processing method shown in FIG. 13, binarization of the macro image (S324), enlargement of the contours of the object region (S325), and exclusion of small regions (S326) are performed. Thereby, final reference macro image data C5 is obtained.

Figure 22:
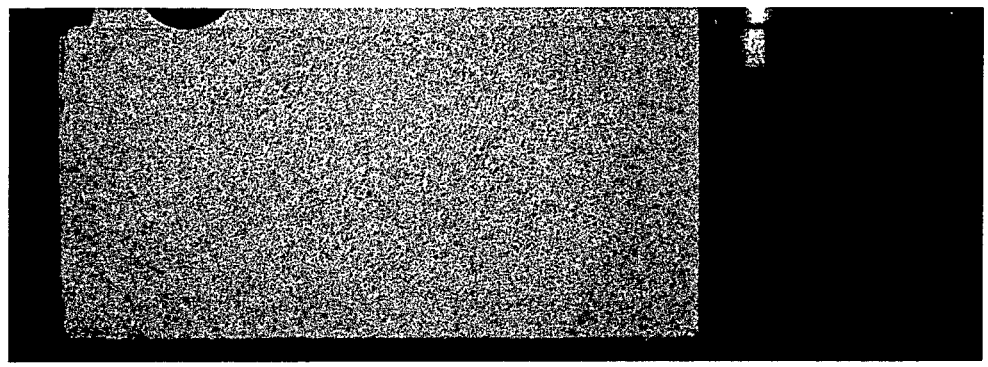
FIG. 22 is a figure with drawings showing examples of a macro image acquired by an image acquiring apparatus.
Figure 22:
Figure 22:
Figure 23:
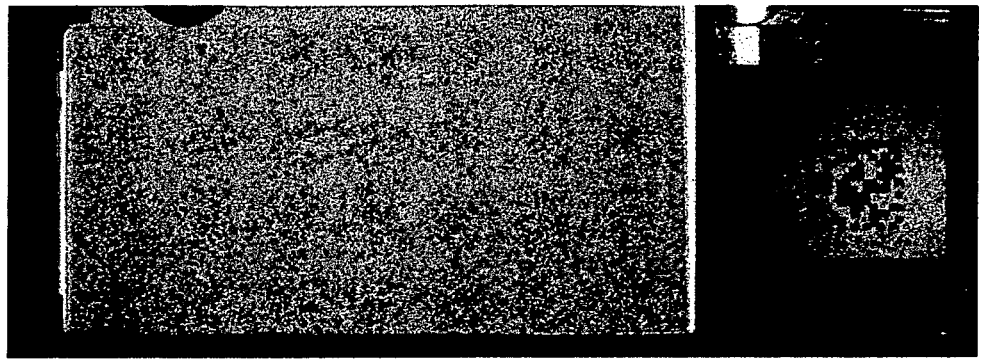
FIG. 23 is a figure with drawings showing examples of a macro image acquired by an image acquiring apparatus.
Figure 23:
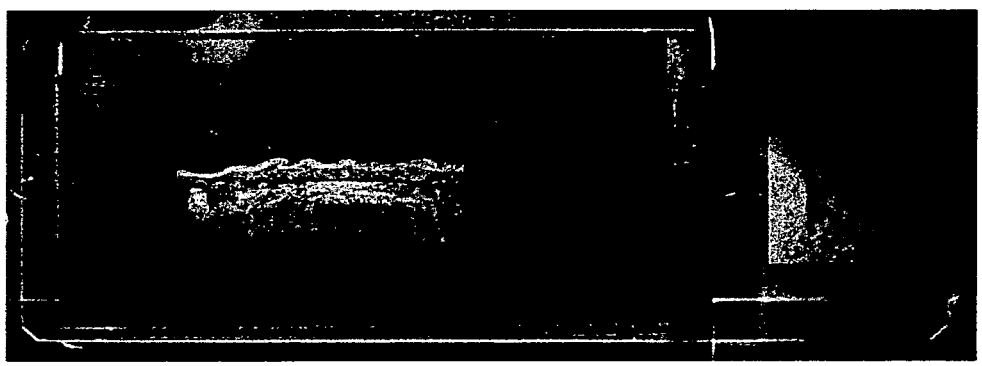
Figure 23:
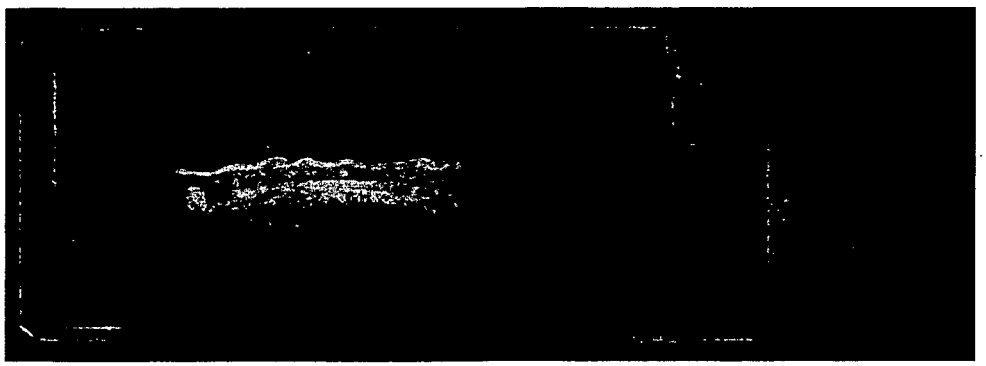

Herein, detailed examples of the macro image to be acquired by using dark field illumination or bright field illumination are shown. FIG. 22 and FIG. 23 are figures with drawings showing examples of macro images to be acquired by the image acquiring apparatus. In the macro images shown in these drawings, a slide containing an unstained biological sample sealed therein is taken as an object of image acquisition.

In FIG. 22, the image (a) is a macro image acquired by bright field illumination with an exposure time of 20 ms. In the case of the unstained sample, as shown in this image (a), it is difficult to recognize the sample by the bright field illumination. On the other hand, the image (b) is a macro image acquired by dark field illumination with an exposure time of 200 ms. In this dark field macro image, it is possible to clearly confirm the sample image due to scattered light from the biological sample.

However, in this image, an image of a diffuser of the bright field light source (see FIG. 3) installed below the slide is seen as well as the sample image. This is considered reflection of reflected light from the sample stage and the slide onto the diffuser of the bright field light source. Such reflection on the diffuser if the exposure time is lengthened to, for example, 500 ms, becomes further strengthened in influence. On the other hand, the image (c) shows a dark field macro image obtained through image arithmetic processing for subtracting a control image acquired for a blank slide. By this image arithmetic processing using the control image, the influence from the reflection onto the diffuser can be eliminated.

To suppress such influence from the reflection onto the diffuser, it is also possible to use a structure in which an ND filter is provided on the bright field light source side. In FIG. 23, the image (a) is a macro image acquired by bright field illumination with an exposure time of 50 ms by providing a 50% ND filter. When the ND filter is provided, a bright field macro image equivalent to that in a case without the ND filter can also be acquired by lengthening the exposure time.

The image (b) is a macro image acquired by dark field illumination with a 50% ND filter and an exposure time of 500 ms, and the image (c) is a dark field macro image subjected to image arithmetic processing for subtracting the control image under the same conditions. By thus providing the ND filter on the bright field light source side, influence from the reflection onto the diffuser in the dark field macro image can be suppressed. As the diffuser, a rough-surface diffuser can also be effectively used. It is preferable that the conditions such as the arrangement of the dark field light source and the bright field light source, the structure of the optical system including the diffuser and the ND filter, the type of the diffuser, the type of the ND filter, and the exposure time for acquiring an image are set according to detailed image acquiring conditions.

The image acquiring apparatus, the image acquiring method, and the image acquiring program of the invention are not limited to those in the embodiment and structure examples, and they can be variously modified. For example, as for the detailed structures of the macro image acquiring unit and the micro image acquiring unit, FIG. 3 and FIG. 4 show examples of these, and in detail, various structures can be used. As for the micro image pickup device, a one-dimensional sensor and a TDI-driven two-dimensional sensor are illustrated in the embodiment, however, it is also possible that a micro image is acquired by a normal two-dimensional sensor.

It is also possible that the same image pickup device is used for the macro image pickup device and the micro image pickup device, and a macro image and a micro image are acquired by switching the optical system including the objective lens. In this case, for example, a structure in which a low-magnification objective lens for macro image acquisition and a high-magnification objective lens for micro image acquisition are attached to an objective lens switching revolver can be used. In the acquisition of a macro image of a sample S, when a whole macro image cannot be acquired by one image, a plurality of partial macro images are acquired by successively moving the sample stage, and these are arranged and combined into a macro image.

Herein, the image acquiring apparatus of the above-described embodiment includes (1) macro image acquiring means for acquiring a macro image of a sample, (2) dark field illuminating means to be used for acquiring a dark field macro image of the sample as a macro image, (3) macro image processing means for processing image data of the macro image to generate a reference macro image, and (4) image pickup condition setting means for setting an image acquiring range corresponding to a range including an object of image acquisition as an image pickup condition of a micro image of the sample by referring to the reference macro image.

The image acquiring method includes (a) a dark field macro image acquiring step for acquiring a dark field macro image as a macro image of a sample by using dark field illuminating means, (b) a macro image processing step for processing image data of the macro image to generate a reference macro image, and (c) an image pickup condition setting step for setting an image acquiring range corresponding to a range including an object of image acquisition as an image pickup condition of a micro image of the sample by referring to the reference macro image.

The image acquiring program makes a computer execute (a) dark field macro image acquisition control processing for controlling an acquiring operation for acquiring a dark field macro image as a macro image of a sample by using dark field illuminating means, (b) macro image processing for processing image data of the macro image to generate a reference macro image, and (c) image pickup condition setting processing for setting an image acquiring range corresponding to a range including an object of image acquisition as an image pickup condition of a micro image of the sample by referring to the reference macro image.

Herein, as for a detailed structure of the dark field illuminating means to be used for acquiring a macro image, it is preferable that the dark field illuminating means irradiates a surface orthogonal to the optical axis for acquiring a macro image with light obliquely from the opposite side of the macro image acquiring means. Thereby, it is possible to preferably acquire a dark field macro image of the sample. As such a structure, for example, there is available a structure in which the dark field illuminating means radiates light from the oblique lower side of the sample with respect to the optical axis for acquiring the macro image. Alternatively, it is also possible that the dark field illuminating means irradiates a surface orthogonal to the optical axis for acquiring a macro image with light obliquely from the macro image acquiring means side.

It is preferable that the image acquiring apparatus further includes micro image acquiring means for acquiring a micro image of a sample, and micro image acquisition control means for controlling a micro image acquiring operation of the micro image acquiring means by referring to the image pickup condition including the image acquiring range set by the image pickup condition setting means. Similarly, it is preferable that the image acquiring method includes a micro image acquiring step for acquiring a micro image of a sample, and a micro image acquisition control step for controlling a micro image acquiring operation in the micro image acquiring step by referring to the image pickup condition including the image acquiring range set in the image pickup condition setting step. Similarly, it is preferable that the image acquiring program makes a computer execute micro image acquisition control processing for controlling an operation for acquiring a micro image of the sample by referring to the image pickup condition including the image acquiring range set by the image pickup condition setting processing.

As described above, a micro image with high resolution is acquired upon providing macro image acquiring means and micro image acquiring means for a sample as an object of image acquisition and setting image pickup conditions by referring to a macro image showing a whole image of the sample, whereby the micro image of the sample can be efficiently acquired. In addition; by acquiring a dark field macro image as described above as a macro image of the sample, even when a sample stained with, for example, a fluorescent dye is set as an object, it is possible to preferably acquire a macro image of the sample at a sufficient contrast and reliably set image pickup conditions of a micro image.

It is also preferable in the image acquiring apparatus that the image pickup condition setting means sets focus related information concerning object image acquisition in an image acquiring range as an image pickup condition. Similarly, in the image acquiring method, it is preferable that, in the image pickup condition setting step, focus related information concerning object image acquisition in the image acquiring range is set as an image pickup condition. Similarly, in the image acquiring program, it is preferable that the image pickup condition setting processing sets focus related information concerning object image acquisition in the image acquiring range as an image pickup condition.

By thus setting focus related information about an image pickup focus as an image pickup condition of a micro image in addition to the image acquiring range, it becomes possible to acquire a micro image of the sample under preferable conditions. Such focus related information includes, for example, one or a plurality of focus measuring positions within the image acquiring range. Alternatively, as focus related information, focus information such as a focal plane for object image acquisition in the image acquiring range is used. When focus measuring positions are set, as for the focus information such as an image pickup focal plane, it is preferable that the focus information is acquired and set by referring to the result of focus measurement with respect to the focus measuring positions.

As processing to be executed for generating a reference macro image from a macro image, it is preferable that processing for generating a binarized image in which an object region and a background region are discriminable by using a predetermined brightness threshold is applied to the macro image. By this binarization of the image, an object region corresponding to an object and a background region other than the object region can be reliably discriminated in the macro image, and based on this, an image acquiring range or the like as an image pickup condition of a micro image can be preferably set.

When the macro image is binarized as described above, it is preferable that processing for enlarging the contour of the object region by a predetermined amount is further applied to the binarized image. Thereby, even when the object is in a complicated shape having, for example, complicated contours, the object region can be preferably discriminated.

It is preferable that processing for judging whether a region to be excluded from the object region by using a predetermined pixel number threshold is applied to the binarized image. As such processing, in detail, for example, small regions whose sizes are equal to or smaller than the pixel number threshold in the object region are regarded as not the object but dust and excluded.

Furthermore, as processing to be applied to the macro image, it is preferable that predetermined image arithmetic processing between the macro image acquired for the sample and a control image acquired without the sample is applied. Thereby, influence from noise caused by something other than the object in the macro image can be eliminated.

The image acquiring apparatus may further include bright field illuminating means to be used for acquiring a bright field macro image of a sample as a macro image. Similarly, the image acquiring method may include a bright field macro image acquiring step for acquiring a bright field macro image as a macro image of the sample by using the bright field illuminating means. Similarly, the image acquiring program may make a computer execute bright field macro image acquisition control processing for controlling acquiring operation for acquiring a bright field macro image as a macro image of the sample by using the bright field illuminating means.

In this case, as processing to be applied to the macro image, it is preferable that predetermined image arithmetic processing between the dark field macro image and the bright field macro image is performed. By thus using the bright field macro image acquired by using the bright field illuminating means of transmitted illumination, etc., as well as the dark field macro image, the contrast of the macro image can be improved.

The present invention is available as an image acquiring apparatus, an image acquiring method, and an image acquiring program by which a macro image of a sample can be preferably acquired.

What is claimed is:

1. An image acquiring apparatus comprising:
    macro image acquiring means for acquiring a macro image of a sample;
    dark field illuminating means to be used for acquiring a dark field macro image of the sample as the macro image;
    macro image processing means for processing image data of the macro image to generate a reference macro image; and
    image pickup condition setting means for setting an image acquiring range corresponding to a range including an object of image acquisition as an image pickup condition of a micro image of the sample by referring to the reference macro image, wherein
    the dark field illuminating means is installed as oblique illuminating means at a position on a side opposite to the macro image acquiring means with respect to the sample, for irradiating the sample with light obliquely with respect to an optical axis for acquiring the macro image and from the side opposite to the macro image acquiring means, such that the sample is placed at a position between the macro image acquiring means and the dark field illuminating means, and
    the macro image acquiring means includes a macro image pickup device capable of acquiring a two-dimensional image of the sample, and acquires the two-dimensional dark field macro image corresponding to a whole image of the sample in a single image acquisition.

2. The image acquiring apparatus according to claim 1, comprising:
    micro image acquiring means for acquiring a micro image of the sample; and
    micro image acquisition control means for controlling an operation for acquiring the micro image by the micro image acquiring means by referring to the image pickup condition including the image acquiring range set by the image pickup condition setting means.

3. The image acquiring apparatus according to claim 1, wherein the image pickup condition setting means sets focus related information concerning acquisition of an image of the object in the image acquiring range as the image pickup condition.

4. The image acquiring apparatus according to claim 1, wherein the macro image processing means applies processing to the macro image to binarize the image by a predetermined brightness threshold to generate a binarized image in which an object region and a background region are discriminable.

5. The image acquiring apparatus according to claim 4, wherein the macro image processing means applies processing to the binarized image to enlarge the contour of the object region by a predetermined amount.

6. The image acquiring apparatus according to claim 4, wherein the macro image processing means applies processing to the binarized image to judge whether the object region includes a region to be excluded by using a predetermined pixel number threshold.

7. The image acquiring apparatus according to claim 1, wherein the macro image processing means performs predetermined image arithmetic processing between the macro image acquired for the sample and a control image acquired without the sample.

8. The image acquiring apparatus according to claim 1, comprising bright field illuminating means to be used for acquiring a bright field macro image of the sample as the macro image.

9. The image acquiring apparatus according to claim 8, wherein the macro image processing means performs predetermined image arithmetic processing between the dark field macro image and the bright field macro image.

10. The image acquiring apparatus according to claim 1, wherein the dark field illuminating means includes a plurality of light sources which supply the light with directivity to the sample and are arranged in line to perform zonal illumination.

11. An image acquiring method comprising:
a dark field macro image acquiring step for acquiring a dark field macro image as a macro image of a sample by using a macro image acquiring unit and a dark field illuminating unit;
a macro image processing step for processing image data of the macro image to generate a reference macro image; and
an image pickup condition setting step for setting an image acquiring range corresponding to a range including an object of image acquisition as an image pickup condition of a micro image of the sample by referring to the reference macro image, wherein
the dark field illuminating unit is installed as an oblique illuminating unit at a position on a side opposite to the macro image acquiring unit with respect to the sample, for irradiating the sample with light obliquely with respect to an optical axis for acquiring the macro image and from the side opposite to the macro image acquiring unit, such that the sample is placed at a position between the macro image acquiring unit and the dark field illuminating unit, and
the macro image acquiring unit includes a macro image pickup device capable of acquiring a two-dimensional image of the sample, and acquires the two-dimensional dark field macro image corresponding to a whole image of the sample in a single image acquisition.

12. The image acquiring method according to claim 11, comprising:
a micro image acquiring step for acquiring a micro image of the sample; and
a micro image acquisition control step for controlling an operation for acquiring the micro image in the micro image acquiring step by referring to the image pickup condition including the image acquiring range set in the image pickup condition setting step.

13. The image acquiring method according to claim 11, wherein the image pickup condition setting step sets focus related information concerning acquisition of an image of the object in the image acquiring range as the image pickup condition.

14. The image acquiring method according to claim 11, wherein the macro image processing step applies processing to the macro image to binarize the image by a predetermined brightness threshold to generate a binarized image in which an object region and a background region are discriminable.

15. The image acquiring method according to claim 14, wherein the macro image processing step applies processing to the binarized image to enlarge the contour of the object region by a predetermined amount.

16. The image acquiring method according to claim 14, wherein the macro image processing step applies processing to the binarized image to judge whether the object region includes a region to be excluded by using a predetermined pixel number threshold.

17. The image acquiring method according to claim 11, wherein the macro image processing step performs predetermined image arithmetic processing between the macro image acquired for the sample and a control image acquired without the sample.

18. The image acquiring method according to claim 11, comprising a bright field macro image acquiring step for acquiring a bright field macro image as the macro image of the sample by using bright field illuminating means.

19. The image acquiring method according to claim 18, wherein the macro image processing step performs predetermined image arithmetic processing between the dark field macro image and the bright field macro image.

20. A non-transitory computer-readable storage medium having embodied thereon an image acquiring program which makes a computer execute:
dark field macro image acquisition control processing for controlling an operation for acquiring a dark field macro image as a macro image of a sample by using a macro image acquiring unit and a dark field illuminating unit;
macro image processing for processing image data of the macro image to generate a reference macro image; and
image pickup condition setting processing for setting an image acquiring range corresponding to a range including an object of image acquisition as an image pickup condition of a micro image of the sample by referring to the reference macro image, wherein
the dark field illuminating unit is installed as an oblique illuminating unit at a position on a side opposite to the macro image acquiring unit with respect to the sample, for irradiating the sample with light obliquely with respect to an optical axis for acquiring the macro image and from the side opposite to the macro image acquiring unit, such that the sample is placed at a position between the macro image acquiring unit and the dark field illuminating unit, and
the macro image acquiring unit includes a macro image pickup device capable of acquiring a two-dimensional image of the sample, and acquires the two-dimensional dark field macro image corresponding to a whole image of the sample in a single image acquisition.

21. The image acquiring method according to claim 11, wherein the dark field illuminating unit includes a light source which supplies the light with directivity to the sample.

22. The image acquiring method according to claim 11, wherein the dark field illuminating unit includes a plurality of light sources which supply the light with directivity to the sample and are arranged in line to perform zonal illumination.

23. The image acquiring apparatus according to claim 1, wherein the dark field illuminating means includes a light source which supplies the light with directivity to the sample.

* * * * *